United States Patent
Li

(10) Patent No.: US 12,155,587 B2
(45) Date of Patent: Nov. 26, 2024

(54) UPLINK DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 485 days.

(21) Appl. No.: 17/607,364

(22) PCT Filed: Apr. 29, 2019

(86) PCT No.: PCT/CN2019/085069
§ 371 (c)(1),
(2) Date: Oct. 28, 2021

(87) PCT Pub. No.: WO2020/220230
PCT Pub. Date: Nov. 5, 2020

(65) Prior Publication Data
US 2022/0224465 A1    Jul. 14, 2022

(51) Int. Cl.
*H04L 5/00* (2006.01)
*H04L 1/1607* (2023.01)
(Continued)

(52) U.S. Cl.
CPC .......... *H04L 5/0032* (2013.01); *H04L 1/1671* (2013.01); *H04L 5/0007* (2013.01); *H04L 5/0096* (2013.01); *H04W 28/16* (2013.01)

(58) Field of Classification Search
CPC ... H04L 5/0032; H04L 5/0007; H04L 5/0096; H04L 1/1671; H04W 28/16
See application file for complete search history.

(56) References Cited

U.S. PATENT DOCUMENTS

2017/0048869 A1    2/2017  Chmiel et al.
2018/0092129 A1*   3/2018  Guo .................... H04B 7/0695
(Continued)

FOREIGN PATENT DOCUMENTS

CN    108023623 A    5/2018
CN    108400850 A    8/2018
(Continued)

OTHER PUBLICATIONS

3GPP TSG RAN WG1 Meeting RAN1#96-bis, R1-1904750 Title:On multi-TRP and multi-panel (Year: 2019).*
(Continued)

*Primary Examiner* — Faruk Hamza
*Assistant Examiner* — Abusayeed M Haque
(74) *Attorney, Agent, or Firm* — Arch & Lake LLP

(57) ABSTRACT

A method and apparatus for transmission of uplink data and storage medium are provided. The method is performed by a base station. The base station includes at least two transmitting points. The method includes that: physical uplink control channel (PUCCH) resource configuration information is transmitted to a terminal. The PUCCH resource configuration information includes respective configuration sub-information corresponding to each of the at least two transmitting points, and the configuration sub-information indicates a PUCCH resource configured for the terminal by the transmitting point.

12 Claims, 4 Drawing Sheets

---

501
In response to PUCCH resources corresponding to at least two pieces of PUCCH information overlapping, the terminal determines respective information types of the at least two pieces of PUCCH information and transmitting points respectively corresponding to the at least two pieces of PUCCH information among N transmitting points in the base station 502
According to the respective information types of the at least two pieces of PUCCH information and the transmitting points respectively corresponding to the at least two pieces of PUCCH information among the N transmitting points, the terminal transmits all or part of the at least two pieces of PUCCH information on PUCCH resources corresponding to the at least two pieces of PUCCH information

(51) Int. Cl.
*H04L 27/26* (2006.01)
*H04W 28/16* (2009.01)

(56) References Cited

U.S. PATENT DOCUMENTS

| | | | |
|---|---|---|---|
| 2018/0227094 | A1 | 8/2018 | Liu et al. |
| 2019/0037561 | A1* | 1/2019 | Jung .................... H04L 1/1812 |
| 2019/0104517 | A1 | 4/2019 | Park |
| 2019/0116605 | A1* | 4/2019 | Luo .................. H04W 72/0446 |
| 2019/0149379 | A1* | 5/2019 | Xiong ..................... H04L 5/006 370/329 |
| 2019/0289588 | A1* | 9/2019 | Akkarakaran ...... H04W 72/046 |
| 2020/0154467 | A1 | 5/2020 | Gong et al. |
| 2020/0281011 | A1 | 9/2020 | Xiong et al. |
| 2021/0195618 | A1* | 6/2021 | Yuan .................. H04W 72/535 |
| 2022/0201727 | A1 | 6/2022 | Gong et al. |
| 2022/0287066 | A1 | 9/2022 | Xiong et al. |

FOREIGN PATENT DOCUMENTS

| | | |
|---|---|---|
| CN | 109586883 A | 4/2019 |
| EP | 3131224 A1 | 2/2017 |
| EP | 3562082 A1 | 10/2019 |
| WO | 2016029486 A1 | 3/2016 |
| WO | 2018141204 A1 | 8/2018 |
| WO | 2018228487 A1 | 12/2018 |
| WO | 2019047950 A1 | 3/2019 |
| WO | 2019073358 A1 | 4/2019 |

OTHER PUBLICATIONS

3GPP TSG RAN WG1 Meeting RAN1#85, R1-164197 Title:PUSCH scheduling for Rel-14 eLAA (Year: 2016).*

3GPP TSG RAN WG1#105-e, R1-2104763 Title: Discussion on the remaining issues with shared spectrum operation determination (Year: 2021).*

First Office Action of the Chinese Application No. 201980000788.7, issued on Apr. 6, 2022, with English translation, (19p).

English translation of the Written Opinion of the International Search Authority in the International Application No. PCT/CN2019/085069, mailed on Jan. 8, 2020, (3p).

Qualcomm Incorporated: "Multi-TRP Enhancements", 3GPP Draft; R1-1903043 Multi-TRP Enhancements, 3rd Generation Partnership Project (3GPP), Mobile Competence Centre; 650, Route Des Lucioles; F-06921 Sophia-Antipolis Cedex ; France vol. RAN WG1, No. Athens, Greece; Feb. 25, 2019-Mar. 1, 2019 Feb. 16, 2019 (Feb. 16, 2019), XP051600739,(30p).

VIVO: "Further Discussion on Multi-TRP Transmission", 3GPP Draft; R1-1905817_Further Discussion On Multi TRP Transmissio, 3rd Generation Partnership Project (3GPP), Mobile Competence Centre; 650, Route Deslucioles; F-06921 Sophia-Antipolis Cedex ; FRA vol. RAN WG1, No. Xi'an, China; Apr. 8, 2019-Apr. 12, 2019 Apr. 15, 2019 (Apr. 15, 2019), XP051707864,(14p).

China Telecom: "Discussion on Multi-TRP/Panel Transmission enhancements", 3GPP Draft; R1-1904914, 3rd Generation Partnership Project (3GPP), Mobile Competence Centre; 650, Route Deslucioles; F-06921 Sophia-Antipolis Cedex ; FRANCE vol. RAN WG1, No. Xi'an, China; Apr. 8, 2019-Apr. 12, 2019 Apr. 7, 2019 (Apr. 7, 2019), XP051700053.(4p).

Nokia et al: "Enhancements on Multi-TRP/Panel Transmission", 3GPP Draft; R1-1905064, 3rd Generation Partnership Project (3GPP), Mobile Competence Centre; 650, Route Deslucioles; F-06921 Sophia-Antipolis Cedex; France vol. Ran WG1, No. Xi'an, China; Apr. 8, 2019-Apr. 12, 2019 Apr. 7, 2019 (Apr. 7, 2019), XP051700163. (20p).

Supplementary European Search Report in the European Application No. 19927171.9, mailed on Dec. 14, 2022, (13p).

International Search Report of PCT Application No. PCT/CN2019/085069 dated Jan. 8, 2020 with English translation, (4p).

Ericsson, "On Multi-TRP and Multi-Panel", Discussion and Decision, 3GPP TSG RAN WG1 Meeting RAN1#96-bis, R1-1904750, Xi'an, China, Apr. 8-12, 2019, (17p).

* cited by examiner

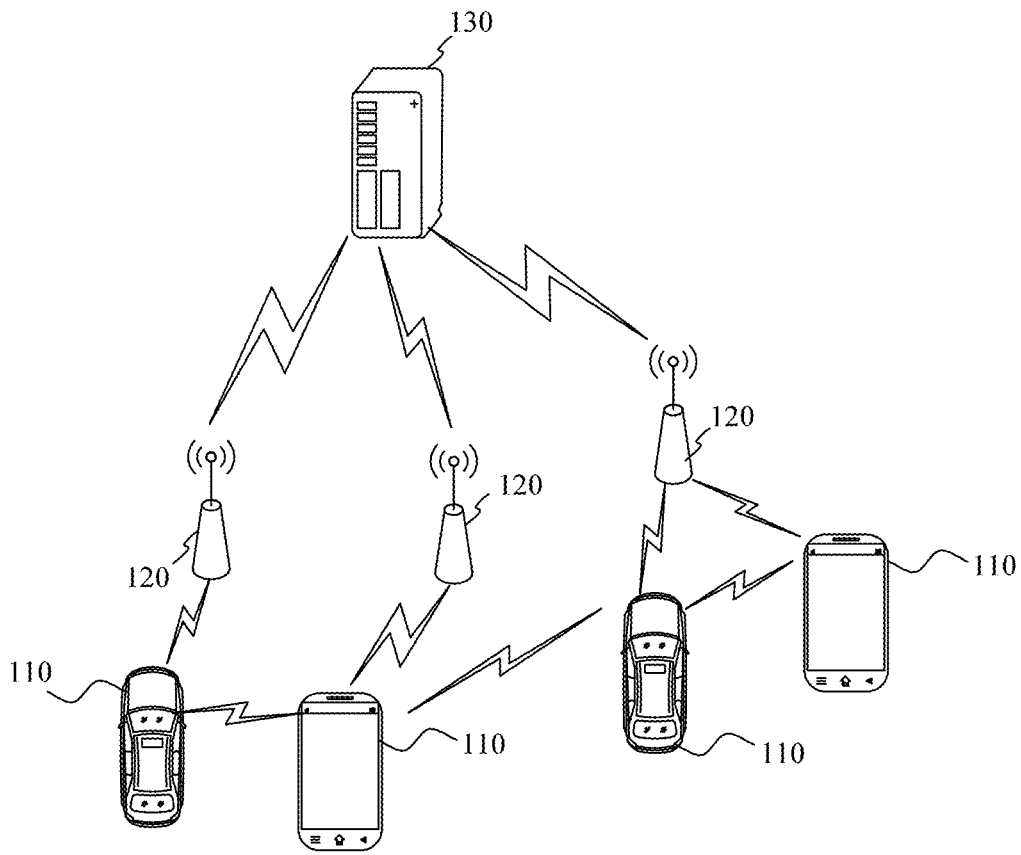

FIG. 1

Physical uplink control channel (PUCCH) resource configuration information is transmitted to a terminal; the PUCCH resource configuration information includes respective configuration sub-information corresponding to each of the N transmitting points, and the configuration sub-information indicates a PUCCH resource configured for the terminal by the transmitting point

FIG. 2

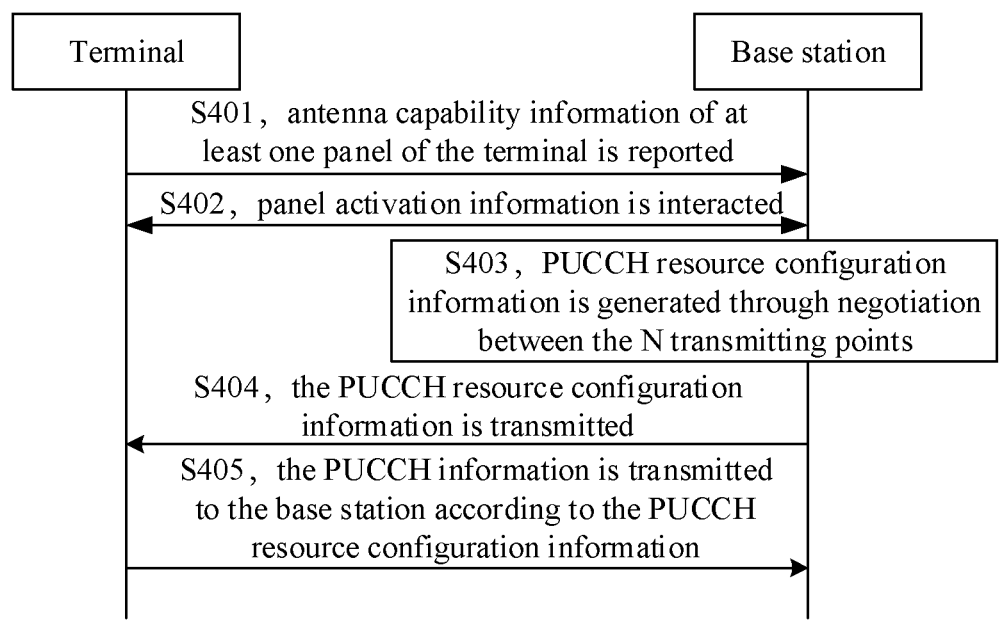

UPLINK DATA TRANSMISSION METHOD AND APPARATUS, AND STORAGE MEDIUM

CROSS-REFERENCE TO RELATED APPLICATION

This application is the U.S. national phase application of International Application No. PCT/CN2019/085069, filed on Apr. 29, 2019, the entire contents of which are incorporated herein by reference for all purposes.

TECHNICAL FIELD

The present disclosure relates to the field of communication technologies, and in particular to a method and apparatus for transmission of uplink data, and a storage medium.

BACKGROUND

In a fifth generation mobile communication (5G), since a high frequency channel attenuates relatively fast, it is necessary to use a beam-based method for transmission and reception in order to ensure a coverage area.

In the related art, many devices in a 5G system have multiple panels, and data can be transmitted and/or received through the cooperation among the multiple panels. When a base station transmits downlink data to a terminal through multiple transmitting points (including at least one panel), correspondingly, the terminal needs to transmit uplink data to the base station for different transmitting points. At present, there is no perfect solution to the problem of how to configure the uplink transmission resources of the terminal when the base station performs downlink transmission to the terminal through the multiple transmitting points.

SUMMARY

The present disclosure provides a method and apparatus for transmission of uplink data, and a storage medium. The technical solutions are as follows.

According to a first aspect of the present disclosure, there is provided a method for transmission of uplink data performed by a base station. The base station includes at least two transmitting points.

The method includes that: physical uplink control channel (PUCCH) resource configuration information is transmitted to a terminal. The PUCCH resource configuration information includes respective configuration sub-information corresponding to each of the at least two transmitting points, and the configuration sub-information indicates a PUCCH resource configured for the terminal by the transmitting point.

According to a second aspect of the present disclosure, there is provided a method for transmission of uplink data performed by a terminal.

The method includes that: PUCCH resource configuration information is received. The PUCCH resource configuration information includes respective configuration sub-information corresponding to each of at least two transmitting points in a base station. Further, the configuration sub-information indicates a PUCCH resource configured for the terminal by the transmitting point.

According to a third aspect of the present disclosure, there is provided an apparatus for transmission of uplink data, for applying to a terminal. The apparatus includes a receiver, a processor, and a memory. The memory is configured to store instructions executable by the processor.

Further, the processor is configured to receive PUCCH resource configuration information through the receiver. The PUCCH resource configuration information includes respective configuration sub-information corresponding to each of at least two transmitting points in a base station. Moreover, the configuration sub-information indicates a PUCCH resource configured for the terminal by the transmitting point.

According to a fourth aspect of the present disclosure, there is provided a computer-readable storage medium including executable instructions that, when invoked by a processor in a terminal to implement the method for transmission of uplink data as described in the first aspect or any alternative manner of the first aspect.

According to a fifth aspect of the present disclosure, there is provided a computer-readable storage medium including executable instructions, a processor in a base station invokes the executable instructions to implement the method for transmission of uplink data as described in the second aspect or any alternative manner of the second aspect.

It should be understood that the above general description and the following detailed description are illustrative and explanatory only and do not limit the present disclosure.

BRIEF DESCRIPTION OF THE DRAWINGS

The accompanying drawings herein are incorporated in and form part of the specification, illustrate embodiments consistent with the present disclosure and together with the specification serve to explain the principles of the present disclosure.

FIG. 1 is a structural diagram of a wireless communication system according to an embodiment of the present disclosure.

FIG. 2 is a flowchart of a method for transmission of uplink data according to an example of the present disclosure.

FIG. 3 is a flowchart of a method for transmission of uplink data according to an example of the present disclosure.

FIG. 4 is a flowchart of a method for transmission of uplink data according to an example of the present disclosure.

DETAILED DESCRIPTION

Figure 5:
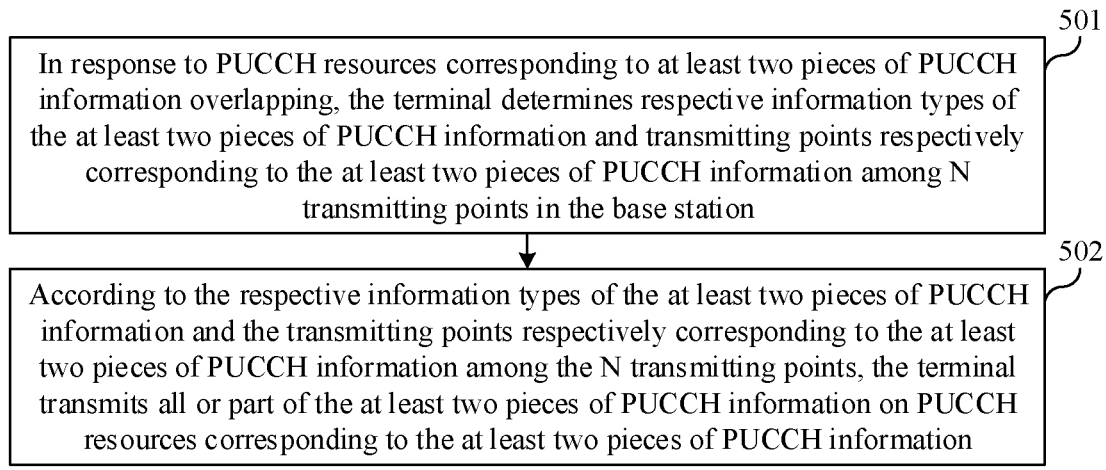
FIG. 5 is a flowchart of a method for transmission of uplink data according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure.

Instead, they are merely examples of apparatuses and methods consistent with aspects related to the present disclosure as recited in the appended claims.

The network architecture and service scenarios described in the embodiments of the present disclosure are intended to explain the technical solutions of the embodiments of the present disclosure more clearly, and do not constitute limitations on the technical solutions provided in the embodiments of the present disclosure. With the evolution of the network architecture and the emergence of new service scenarios, a person of ordinary skill in the art will appreciate that the technical solutions provided in the embodiments of the present disclosure are equally applicable to similar technical problems.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Referring to FIG. 1, FIG. 1 is a schematic structural diagram of a wireless communication system according to an embodiment of the present disclosure. As illustrated in FIG. 1, a wireless communication system is a communication system based on cellular mobile communication technology, and the wireless communication system may include multiple terminals 110 and multiple base stations 120.

The terminal 110 may be a device that provides voice and/or data connectivity to a user. The terminal 110 may communicate with one or more core networks via a radio access network (RAN). The terminal 110 may be an Internet-of-Things terminal, such as a sensor device, a mobile phone (or referred to as a "cellular" phone) and a computer having an Internet-of-Things terminal. For example, the terminal 110 may be a fixed apparatus, a portable apparatus, a pocket-sized apparatus, a handheld apparatus, a computer built-in apparatus or an in-vehicle apparatus. For example, the terminal 110 may be a station (STA), a subscriber unit, a subscriber station, a mobile station, a mobile, a remote station, an access point, a remote terminal, an access terminal, a user terminal, a user agent, a user device or user equipment (UE). Alternatively, the terminal 110 may also be a device of an unmanned aerial vehicle. Alternatively, the terminal 110 may be a vehicle-mounted device, for example, a trip computer having a wireless communication function, or a wireless communication device connected to the trip computer. Alternatively, the terminal 110 may be a roadside device, such as a street lamp, a signal lamp, or other roadside device that has a wireless communication function.

The base station 120 may be a network side device in a wireless communication system. The wireless communication system may be the 4th generation mobile communication (4G) system, which is also known as a long term evolution (LTE) system. Alternatively, the wireless communication system may be a 5G system, which is also known as a new radio system (NR) or a 5G NR system. Alternatively, the wireless communication system may be a next generation system of a 5G system. The access network in the 5G system may be referred to as a NG-RAN (New Generation-Radio Access Network).

The base station 120 may be an evolved NodeB (eNB) used in a 4G system. Alternatively, the base station 120 may be a base station (gNB) adopting a centralized-distributed architecture in a 5G system. When the base station 120 adopts a centralized-distributed architecture, the base station 120 generally includes a central unit (CU) and at least two distributed units (DU). The central unit is provided with protocol stacks of a Packet Data Convergence Protocol (PDCP) layer, a Radio Link Control (RLC) Protocol layer and a Media Access Control (MAC) layer. The distributed unit is provided with a protocol stack of a Physical (PHY) layer. A specific implementation of the base station 120 is not limited in the embodiment of the present disclosure.

A wireless connection may be established between the base station 120 and the terminal 110 via a wireless air interface. In various embodiments, the wireless air interface is based on the fourth generation mobile communication network technology (4G) standard. Alternatively, the wireless air interface is based on the fifth generation mobile communication network technology (5G) standard, for example, the wireless air interface is a new radio. Alternatively, the wireless air interface may be based on the next generation mobile communication network technology standard of 5G.

Alternatively, an E2E (End to End) or D2D (device to device) connection may also be established between terminals 110. For example, V2V (vehicle to vehicle) communication, V2I (vehicle to Infrastructure) communication, and V2P (vehicle to pedestrian) communication in vehicle to everything (V2X).

In a case that a connection is established between terminals, if one or more terminals function as a base station in communication between terminals, the one or more terminals may also be regarded as the base station 120, and other terminals may be regarded as the terminal 110.

For example, in the V2X scenario, the vehicle-mounted terminal A reports capability information (for example, antenna capability information) of the vehicle-mounted terminal A to another vehicle-mounted terminal B. The vehicle-mounted terminal B controls the communication between the vehicle-mounted terminal A and the vehicle-mounted terminal B according to the capability information of the vehicle-mounted terminal A. In other words, the vehicle-mounted terminal B acts as a head car in the V2X. In this case, the vehicle-mounted terminal B may be regarded as the above-described base station 120, and the vehicle-mounted terminal A may be regarded as the above-described terminal 110.

Alternatively, the wireless communication system may further include a network management device 130.

Multiple base stations 120 are respectively connected to the network management device 130. The network management device 130 may be a core network device in a wireless communication system. For example, the network management device 130 may be a Mobility Management Entity (MME) in an Evolved Packet Core network (EPC). Alternatively, the network management device may be another core network device, such as a Serving GateWay (SGW), a Public Data Network GateWay (PGW), a Policy and Charging Rules Function (PCRF) or a Home Subscriber Server (HSS). Embodiments of the present disclosure are not limited to the implementation form of the network management device 130.

In the 5G NR system, especially when the communication frequency band is within the Frequency range 2 (above 6 GHz), since the high frequency channel attenuate relatively fast, it is necessary to use beam-based transmission and reception between the terminal and the base station in order to ensure the coverage area.

At present, in the related art, in an actual application scenario, it is considered that the base station transmits data to the user through one panel. When all data transmitted by the base station is transmitted through one panel, since the same panel can only point to one beam direction at the same time, the terminal receives the downlink data transmitted by the base station through a beam direction, that is, a receiving beam. The receiving beam is generally indicated by a TCI (transmission configuration indication) state. Each TCI state corresponds to a reference signal identifier (also referred to as an RS index) for uniquely indicating a corresponding reference signal (RS). Different RSs have different RS identifiers. Alternatively, in the embodiment of the present disclosure, the RS may be NZP CSI-RS (Non-Zero Power Channel State Information Reference Signal), SSB (Synchronization Signal Block), or other reference signals, which are not limited in the embodiment of the present disclosure. Referring to Table 1, which shows a table of a correspondence between the TCI state and the RS identifier according to an embodiment of the present disclosure. Table 1 includes the correspondence between the TCI state and the RS identifier.

TABLE 1

| TCI state | RS index |
|---|---|
| TCI#0 | SSB index#1 |
| TCI#1 | SSB index#2 |
| TCI#2 | CSI-RS index#5 |
| TCI#3 | CSI-RS index#6 |
| . . . | . . . |

For example, when the base station notifies the terminal via Downlink Control Information (DCI) that the TCI state is TCI #1, it means that the base station notifies the terminal to receive the downlink data on the PDSCH (Physical Downlink Shared Channel) using a receiving beam that receives SSB index #2.

In a 5G NR system, the base station and the terminal may perform data transmission through multiple panels. For scenario of the multiple panels, the base station may have multiple panels that may simultaneously point to different beam directions. The base station may transmit the downlink data to the terminal through transmitting beams on the multiple panels, or may receive the uplink data transmitted by the terminal through receiving beams on the multiple panels. The multiple panels may belong to the same TRP (Transmitter Receiver Point), or may belong to multiple different TRPs. That is, a base station may have one or more TRPs, each TRP may have one or more panels, and different panels may correspond to different beam directions.

Similarly, the terminal may have multiple panels. The terminal may receive the downlink data transmitted by the base station through respective beams on the multiple panels, or may transmit the uplink data to the base station through respective beams on the multiple panels.

At present, the terminal supports simultaneous activation of multiple panels, but transmits uplink data through one panel at the same time. If the base station transmits the downlink data to the terminal through multiple transmitting points (such as the above-mentioned TRPs) or multiple panels and each TRP or panel transmits DCI signaling to the terminal through a respective physical downlink control channel (PDCCH) to schedule the terminal to receive a PDSCH transmitted by the TRP or panel, then for Hybrid Automatic Repeat reQuest (HARQ) feedbacks (such as HARQ ACK/NACK feedbacks) for PDSCHs transmitted by different TRPs or panels, PUCCH (Physical Uplink Control Channel) resources for the HARQ feedbacks corresponding to different TRPs or panels need to be transmitted in a time division multiplexing manner because the terminal can only use one panel for transmitting at the same time.

If there is an ideal backhaul connection between multiple TRPs or multiple panels, i.e. a time delay in a signaling interaction between the multiple TRPs or the multiple panels is relatively small, then the PUCCH resources configured for each TRP or panel are easy to be configured. However, if there is a non-ideal backhaul connection between multiple TRPs or multiple panels, i.e. a time delay in a signaling interaction between the multiple TRPs or the multiple panels is relatively large, then the PUCCH resources configured for each TRP or panel on the terminal side may overlap and collide.

Referring to FIG. 2, FIG. 2 is a flowchart of a method for transmission of uplink data according to an example of the present disclosure. The method is applied to the wireless communication system illustrated in FIG. 1, and is performed by a base station in the wireless communication system. The base station includes N transmitting points, N is an integer greater than or equal to 2. As illustrated in FIG. 2, the method includes the following operations.

In operation 201, physical uplink control channel (PUCCH) resource configuration information is transmitted to the terminal; the PUCCH resource configuration information includes respective configuration sub-information corresponding to each of the N transmitting points, and the configuration sub-information indicates a PUCCH resource configured for the terminal by the transmitting point.

Alternatively, before the PUCCH resource configuration information is transmitted to the terminal, the method further includes the following operations.

The PUCCH resource configuration information is generated through negotiation between the N transmitting points.

Alternatively, the operation that the PUCCH resource configuration information is transmitted to the terminal includes the following operations.

The PUCCH resource configuration information is transmitted to the terminal through a radio resource control (RRC) signaling.

A resource activation instruction is transmitted to the terminal when performing a PUCCH resource scheduling for the terminal. The resource activation instruction is configured to instruct the terminal to activate the PUCCH resource configured by the PUCCH resource configuration information.

Alternatively, the operation that the resource activation instruction is transmitted to the terminal when performing the PUCCH resource scheduling for the terminal includes the following operations.

The resource activation instruction is transmitted through a media access control control unit (MAC CE) when performing the PUCCH resource scheduling for the terminal.

Alternatively, the configuration sub-information includes a resource configured for the terminal by the transmitting point for transmitting a hybrid automatic repeat request (HARM) feedback.

The operation that the PUCCH resource configuration information is transmitted to the terminal includes the following operations.

The PUCCH resource configuration information is transmitted to the terminal through downlink control information (DCI).

Alternatively, configuration sub-information of a primary transmitting point among the N transmitting points includes a first time-frequency resource configured for the terminal by the primary transmitting point for transmitting the HARQ feedback.

Configuration sub-information of another transmitting point includes a resource offset of a second time-frequency resource relative to the first time-frequency resource. The second time-frequency resource is a time-frequency resource configured for the terminal by the another transmitting point for transmitting the HARQ feedback, and the another transmitting point is any transmitting point, other than the primary transmitting point, among the N transmitting points.

Alternatively, the offset of the second time-frequency resource relative to the first time-frequency resource includes a time domain offset of the second time-frequency resource relative to the first time-frequency resource.

A frequency domain resource corresponding to the second time-frequency resource is the same as a frequency domain resource corresponding to the first time-frequency resource and a number of orthogonal frequency division multiplexing (OFDM) symbols occupied by the second time-frequency resource is the same as a number of OFDM symbols occupied by the first time-frequency resource.

Alternatively, before the PUCCH resource configuration information is transmitted to the terminal, the method further includes the following operations.

Antenna capability information of at least one panel of the terminal is obtained.

The operation that the PUCCH resource configuration information is transmitted to the terminal includes the following operations.

The PUCCH resource configuration information is transmitted to the terminal according to the antenna capability information.

Alternatively, the operation that the PUCCH resource configuration information is transmitted to the terminal according to the antenna capability information includes the following operations.

Panel activation information is obtained. The panel activation information indicates an activated panel in the at least one panel.

The PUCCH resource configuration information is transmitted to the terminal according to the panel activation information and the antenna capability information.

Alternatively, the operation that the PUCCH resource configuration information is transmitted to the terminal according to the panel activation information and the antenna capability information includes the following operations.

Time resource interval threshold information is determined according to the panel activation information and the antenna capability information. The time resource interval threshold information indicates a minimum time interval for the terminal to transmit uplink information on two PUCCH resources.

The PUCCH resource configuration information is transmitted to the terminal according to the time resource interval threshold information.

Alternatively, the time resource interval threshold information includes at least one of: a first time interval threshold T1, a second time interval threshold T2, a third time interval threshold T3 or a fourth time interval threshold T4.

The T1 is a minimum time interval for transmitting uplink data on different PUCCH resources successively through two panels in a case that the two panels are capable of being activated simultaneously.

The T2 is a minimum time interval for transmitting uplink data on different PUCCH resources successively through two panels in a case that the two panels are not capable of being activated simultaneously.

The T3 is a minimum time interval for transmitting uplink data on different PUCCH resources successively through two panels in a case that the two panels are capable of being activated simultaneously and the two panels are not capable of performing uplink transmission simultaneously.

The T4 is a minimum time interval for transmitting uplink data on different PUCCH resources successively using different beams through the same panel.

In conclusion, in the solution shown in the embodiment of the present disclosure, the base station having N transmitting points transmits to the terminal PUCCH resource configuration information including respective configuration sub-information corresponding to each of the N transmitting points, and each configuration sub-information indicates a PUCCH resource configured for the terminal by a respective one of the transmitting points, thereby providing a solution in which multiple transmitting points in the base station respectively configure PUCCH resources for the terminal, which extends a scheduling scenario of the PUCCH resources.

Referring to FIG. 3, FIG. 3 is a flowchart of a method for transmission of uplink data according to an example of the present disclosure. The method is applied to the wireless communication system illustrated in FIG. 1 and is performed by a terminal in the wireless communication system. As illustrated in FIG. 3, the method includes the following operations.

In operation 301, PUCCH resource configuration information is received, the PUCCH resource configuration information includes respective configuration sub-information corresponding to each of N transmitting points in a base station, and the configuration sub-information indicates a PUCCH resource configured for the terminal by the transmitting point, N is an integer greater than or equal to 2.

Alternatively, the operation that the PUCCH resource configuration information is received includes the following operations.

The PUCCH resource configuration information transmitted through an RRC signaling is received.

A resource activation instruction is received. The resource activation instruction is configured to schedule the PUCCH resource.

The PUCCH resource configured by the PUCCH resource configuration information is activated according to the resource activation instruction.

Alternatively, the operation that the resource activation instruction is received includes the following operations.

The resource activation instruction transmitted through an MAC CE when the base station performs a PUCCH resource scheduling for the terminal is received.

Alternatively, the configuration sub-information includes a resource configured for the terminal by the transmitting point for transmitting a hybrid automatic repeat request (HARM) feedback.

The operation that the PUCCH resource configuration information is received includes the following operations.

The PUCCH resource configuration information transmitted through DCI is received.

Alternatively, configuration sub-information of a primary transmitting point among the N transmitting points includes a first time-frequency resource configured for the terminal by the primary transmitting point for transmitting the HARQ feedback.

Configuration sub-information of another transmitting point includes a resource offset of a second time-frequency resource relative to the first time-frequency resource. The second time-frequency resource is a time-frequency resource configured for the terminal by the another transmitting point for transmitting the HARQ feedback, and the another transmitting point is any transmitting point, other than the primary transmitting point, among the N transmitting points.

Alternatively, the offset of the second time-frequency resource relative to the first time-frequency resource includes a time domain offset of the second time-frequency resource relative to the first time-frequency resource.

A frequency domain resource corresponding to the second time-frequency resource is the same as a frequency domain resource corresponding to the first time-frequency resource and a number of orthogonal frequency division multiplexing (OFDM) symbols occupied by the second time-frequency resource is the same as a number of OFDM symbols occupied by the first time-frequency resource.

Alternatively, the method further includes the following operations.

In response to PUCCH resources corresponding to at least two pieces of PUCCH information overlapping, respective information types of the at least two pieces of PUCCH information and transmitting points respectively corresponding to the at least two pieces of PUCCH information among the N transmitting points are determined.

According to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information.

The information types include HARQ feedback information and non-HARQ feedback information. The N transmitting points include a primary transmitting point and another transmitting point other than the primary transmitting point.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information, includes the following operations.

In response to the at least two pieces of PUCCH information including HARQ feedback information corresponding to the primary transmitting point and HARQ feedback information corresponding to the another transmitting point, the at least two pieces of PUCCH information are transmitted in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information, includes the following operations.

In response to the at least two pieces of PUCCH information including HARQ feedback information corresponding to the primary transmitting point and non-HARQ feedback information corresponding to the another transmitting point, the at least two pieces of PUCCH information are transmitted in the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information, includes the following operations.

In response to the at least two pieces of PUCCH information including non-HARQ feedback information corresponding to the primary transmitting point and HARQ feedback information corresponding to the another transmitting point, the at least two pieces of PUCCH information are transmitted in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

In conclusion, in the solution shown in the embodiment of the present disclosure, the terminal may receive, from the base station, PUCCH resource configuration information including respective configuration sub-information corresponding to each of the N transmitting points, each configuration sub-information indicates a PUCCH resource configured for the terminal by a respective one of the N transmitting points, thereby providing a solution of respectively configuring PUCCH resources for the terminal by multiple transmitting points in the base station, which extends a scheduling scenario of the PUCCH resources.

According to the solutions proposed in the embodiments of the present disclosure, PUCCH resources for multiple transmitting points may be configured for the terminal according to information such as the panel capability of the terminal and the number of panels currently activated, and according to the time required for the panel switching or the beam switching, so as to avoid overlapping and colliding.

Referring to FIG. 4, FIG. 4 is a flowchart of a method for transmission of uplink data according to an example of the present disclosure. The method may be applied to the wireless communication system illustrated in FIG. 1, and the method is performed by a terminal and a base station in the wireless communication system. The base station includes N transmitting points, N is an integer greater than or equal to 2. As illustrated in FIG. 4, the method may include the following operations.

In operation 401, the terminal reports antenna capability information of at least one panel of the terminal to the base station. Correspondingly, the base station receives the antenna capability information reported by the terminal.

Alternatively, the antenna capability information includes at least one of the following information 1)-3).

1) The number of panels of the terminal.

In the embodiment of the present disclosure, the terminal may report the number of panels included in the terminal to the base station. For example, when the terminal includes two panels, the terminal may report to the base station that the number of panels is 2.

2) Whether or not two or more panels are capable of being activated simultaneously, when the number of panels is greater than or equal to 2.

In an embodiment of the present disclosure, when the terminal includes two or more panels, the terminal also reports to the base station whether the two or more panels are capable of being activated simultaneously.

For example, when the terminal has two panel entities, the two panel entities are capable of being activated simultaneously or at the same time, but when there is only one panel entity in the terminal and the one panel entity is capable of pointing to different directions at different times, it is considered that the terminal can activate only one panel at the same time.

3) Whether or not two or more panels are capable of performing downlink reception simultaneously, when the number of panels is greater than or equal to 2 and the two or more panels are capable of being activated simultaneously.

In the embodiment of the present disclosure, when the terminal includes two or more panels, and the two or more panels are capable of being activated simultaneously, the terminal may also report to the base station whether the two or more panels are capable of simultaneously transmitting uplink data, such as transmitting physical uplink control channels (PUCCHs) simultaneously. In the present disclosure, we are directed to a terminal capable of simultaneously transmitting PUCCHs on only one panel.

In operation 402, panel activation information is interacted between the terminal and the base station, the panel activation information indicates an activated panel among the at least one panel of the terminal.

In the solution shown in the embodiment of the present disclosure, according to the antenna capability of the terminal, some information may also be interacted between the base station and the terminal to determine which antenna state the terminal uses to communicate with the base station for the next period of time, and the flow of interacting information may be as follows.

1) The base station generates panel activation information according to the antenna capability information transmitted by the terminal, and transmits the panel activation information to the terminal. Correspondingly, the terminal receives the panel activation information.

In a possible solution, the terminal first reports its own panel capability information, and the base station transmits an activation instruction to activate one or more panels of the terminal according to the panel capability information of the terminal. The terminal completely follows the activation instruction of the base station, and activates its own panels according to the activation instruction. The activation instruction in this solution is equivalent to the above-described panel activation information.

2) The base station transmits a panel activation indication to the terminal according to the antenna capability information transmitted by the terminal. The terminal receives the panel activation indication, determines an activated panel among the at least one panel according to the panel activation indication, generates the panel activation information according to the determined activated panel, and transmits the panel activation information to the base station. The base station receives the panel activation information.

In another possible solution, the terminal first reports its own panel capability information, and the base station activates, by transmitting an activation instruction, one or more panels of the terminals according to the panel capability information of the terminal. The terminal may not completely follows the activation instruction of the base station, and may activate its panels according to the activation instruction and its own wishes (for example, when the terminal wants to save more power, it may activate less panels; or when the terminal does not need to save power and a large data rate is desired, the terminal activates more panels), and then the terminal feeds back the activated panel information finally determined by the terminal itself to the base station. In this solution, the activated panel information finally determined by the terminal is equivalent to the above-mentioned panel activation information.

3) The terminal generates the panel activation information according to the antenna capability information, and transmits the panel activation information to the base station. The base station receives the panel activation information.

In still another possible solution, the terminal reports its own panel capability information, determines a panel that the terminal itself wants to activate, and then notifies the base station of information about the panel activated by the terminal itself. In this solution, the information about the panel activated by the terminal is equivalent to the above-mentioned panel activation information.

In this solution, the operation of reporting the panel capability information and transmitting the panel activation information to the base station by the terminal may be performed separately or synchronously.

In the embodiment of the present disclosure, the base station may obtain the antenna capability information of the at least one panel of the terminal, and subsequently transmit PUCCH resource configuration information to the terminal according to the antenna capability information.

For example, the base station may obtain the panel activation information, and transmit PUCCH resource configuration information to the terminal according to the panel activation information and the antenna capability information.

A manner in which the base station transmits the PUCCH resource configuration information to the terminal may be shown in subsequent operations.

In operation 403, the base station generates PUCCH resource configuration information for the terminal through negotiation between the N transmitting points, the PUCCH resource configuration information includes respective configuration sub-information corresponding to each of the N transmitting points.

The configuration sub-information indicates a PUCCH resource configured for the terminal by the transmitting point.

In an embodiment of the present disclosure, the PUCCH resource configuration information may configure respective multiple PUCCH resources corresponding to each transmitting point, or the PUCCH resource configuration information may configure a respective PUCCH resource set corresponding to each transmitting point, or the PUCCH resource configuration information may configure a respective PUCCH resource group corresponding to each transmitting point. Each PUCCH resource set or each PUCCH resource group includes multiple PUCCH resources.

In the embodiment of the present disclosure, before scheduling the PUCCH resources for the terminal, the N transmitting points (such as TRPs) in the base station may interact with each other to negotiate and determine the PUCCH resources scheduled by respective transmitting points for the terminal, so as to avoid resource collision to the utmost extent when the terminal side transmits PUCCH information.

In a case that the base station generates PUCCH resource configuration information for the terminal through negotiation between the N transmitting points, the base station may generate, according to the panel activation information and the antenna capability information, the PUCCH resource configuration information through negotiation between the N transmitting points.

Considering that the terminal may alternately transmit the PUCCH information through multiple panels, so in a case of generating the PUCCH resource configuration information through negotiation, the PUCCH resource configuration information may be generated, according to the antenna capability information of the terminal, by the respective transmitting points through negotiation.

Alternatively, in a case of generating the PUCCH resource configuration information through negotiation between the N transmitting points according to the antenna capability information, the base station may determine a time resource interval threshold information according to the panel activation information and the antenna capability information, the time resource interval threshold information is configured to indicate a minimum time interval for the terminal to transmit information on two PUCCH resources using at least one of: different panels or different beams; and generate the PUCCH resource configuration information through negotiation between the N transmitting points according to the time resource interval threshold information, so as to subsequently transmit the PUCCH resource configuration information to the terminal.

Alternatively, the time resource interval threshold information includes at least one of: a first time interval threshold T1, a second time interval threshold T2, a third time interval threshold T3 or a fourth time interval threshold T4. The above T1 to T4 may be provided as follows.

a) The T1 is a minimum time interval for transmitting uplink data on different PUCCH resources successively through two panels when the two panels are capable of being activated simultaneously.

If the two panels in the terminal are capable of being activated simultaneously, the switching time between the panels is relatively small. For example, when the terminal needs to use the panel 1 to perform transmission on the first PUCCH resource and use the panel 2 to perform transmission on the second PUCCH resource, the time interval between the first PUCCH resource and the second PUCCH resource needs to be at least T1. The T1 is the time required for the terminal to switch the panels.

b) The T2 is a minimum time interval for transmitting uplink data on different PUCCH resources successively through two panels when the two panels are not capable of being activated simultaneously.

For example, if the two panels in the terminal are not capable of being activated simultaneously, the terminal needs to use the panel 1 to perform transmission on the first PUCCH resource and use the panel 2 to perform transmission on the second PUCCH resource, and then the time interval between the two PUCCH resources needs to be at least T2.

c) The T3 is a minimum time interval for transmitting uplink data on different PUCCH resources successively through two panels when the two panels are capable of being activated simultaneously and the two panels are not capable of performing uplink transmission simultaneously.

In an embodiment of the present disclosure, a setting of T3 may be considered when multiple panels in the terminal are capable of being activated simultaneously. For example, when two panels in the terminal are capable of being activated simultaneously and the two panels are not capable of transmitting uplink data simultaneously (for example the terminal wants to save power), the time interval between the above two PUCCH resources is at least T3.

d) The T4 is a minimum time interval for transmitting uplink data on different PUCCH resources successively using different beams through the same panel.

In an embodiment of the present disclosure, if the terminal is required to use different beams in the same panel for transmitting two PUCCH resources, the time interval between these two PUCCH resources is at least T4.

The above specific values for the four thresholds T1 to T4 can be set by the system in advance.

The four thresholds T1 to T4 have a certain magnitude relationship. For example, the value of T1 is less than the value of T2, and the value of T3 is similar to the value of T1.

Alternatively, in a case of generating the PUCCH resource configuration information through negotiation between the N transmitting points according to the antenna capability information, the base station may obtain the panel activation information of the terminal, and generate the PUCCH resource configuration information through negotiation between the N transmitting points according to the panel activation information and the antenna capability information.

In the embodiment of the present disclosure, since the terminal may not activate all the panels among the multiple panels, but may activate only a part of the multiple panels, when the base station generates the PUCCH resource configuration information through negotiation between the N transmitting points, the antenna capability information in combination with the panel activation information can be considered to perform the PUCCH resource configuration.

In operation 404, the base station transmits the PUCCH resource configuration information to the terminal, and correspondingly, the terminal receives the PUCCH resource configuration information.

In a possible implementation, when transmitting the PUCCH resource configuration information to the terminal, the base station may transmit the PUCCH resource configuration information to the terminal through a radio resource control (RRC) signaling, and correspondingly, the terminal receives the PUCCH resource configuration information transmitted through the RRC signaling. The base station transmits a resource activation instruction to the terminal when performing the PUCCH resource scheduling for the terminal, the resource activation instruction is configured to instruct the terminal to activate the PUCCH resource configured by the PUCCH resource configuration information to schedule the PUCCH resource. Correspondingly, the terminal receives the resource activation instruction, and activates the PUCCH resource configured by the PUCCH resource configuration information according to the resource activation instruction.

In the embodiment of the present disclosure, the PUCCH resource configuration information negotiated by the N transmitting points of the base station may be periodic PUCCH resource configuration information and may be configured in the terminal through a RRC signaling. When a PUCCH resource needs to be scheduled for the terminal, the base station may transmit a resource activation instruction to the terminal to instruct the terminal to activate the PUCCH resource being scheduled.

Alternatively, when generating the PUCCH resource configuration information, PUCCH resources indicated by the configuration sub-information corresponding to respective transmitting points may overlap. When scheduling PUCCH resources for the terminal, PUCCH resources corresponding to different transmitting points among PUCCH resources corresponding to the resource activation instruction transmitted by the base station to the terminal may not overlap.

Alternatively, when performing PUCCH resource scheduling for the terminal, the resource activation instruction may be transmitted through a media access control control element (MAC CE). Correspondingly, the terminal receives the resource activation instruction transmitted by the base station through the MAC CE.

In the foregoing possible implementations, the base station transmits the PUCCH resource configuration information and the resource activation instruction to the terminal, which may be that a certain transmitting point (such as a primary transmitting point) in the base station transmits the PUCCH resource configuration information and the resource activation instruction.

Alternatively, the base station transmits the PUCCH resource configuration information and the resource activation instruction to the terminal, which may be that each transmitting point in the base station transmits respective configuration sub-information in the PUCCH resource configuration information, and each transmitting point transmits a respective resource activation instruction.

Alternatively, the base station transmits the PUCCH resource configuration information and the resource activation instruction to the terminal, which may be that a certain transmitting point (such as a primary transmitting point) in the base station transmits the PUCCH resource configuration information, each transmitting point in the base station transmits a respective resource activation instruction.

For example, a base station configures PUCCH resources for multiple transmitting points through an RRC signaling, and then activates a part of the PUCCH resources through an MAC CE during a resource scheduling. For example, the base station uses the TRP #0 as a primary TRP for transmitting the RRC signaling and the MAC CE signaling. The other TRPs provide the TRP #0 with PUCCH resources that they need to configure for the terminal, so as to summarize PUCCH resources at the TRP #0 end, and negotiate to determine their respective PUCCH resources, for example, PUCCH resources that do not overlap and collide with each other or PUCCH resources with less overlap and collision (and the time interval between every two PUCCH resources is greater than or equal to the time required for the terminal to perform beam/panel switching) are negotiated. Then the TRP #0 is used for transmitting the RRC signaling to the terminal. The RRC signaling includes information about identifiers (IDs) of respective TRPs and a PUCCH resource corresponding to each TRP, and the PUCCH resource includes a time-frequency resource and information about at least one of a transmitting beam or a panel used by the terminal to transmit a PUCCH. When the PUCCH resource needs to be activated, the base station transmits the MAC CE activation information through the TRP #0 to activate the PUCCH resources corresponding to the multiple TRPs.

Alternatively, the multiple TRPs may negotiate that the PUCCH resources used by themselves do not overlap. Each TRP transmits an RRC signaling to the terminal to configure the PUCCH resource, and when necessary, each TRP transmits an MAC CE to the terminal to activate the PUCCH resource included in the RRC signaling for an HARQ feedback.

In the above solution, uplink transmitting beam information corresponding to the PUCCH resource configured by each TRP may be obtained by the terminal according to a PDCCH transmitted by the TRP to the terminal. For example, a DCI signaling in the PDCCH may explicitly give the uplink transmitting beam information corresponding to the PUCCH resource, or the uplink transmitting beam for the PUCCH may be an uplink transmitting beam corresponding to the downlink beam for receiving the latest PDCCH.

In another possible implementation, the configuration sub-information includes the PUCCH resource, configured for the terminal by the transmitting point, for transmitting a hybrid automatic repeat request (HARQ) feedback. When transmitting the PUCCH resource configuration information to the terminal, the base station transmits the PUCCH resource configuration information to the terminal through downlink control information DCI.

In the embodiment of the present disclosure, the PUCCH resource configuration information negotiated by the N transmitting points of the base station may be aperiodic PUCCH resource configuration information, and the PUCCH resource configuration information is transmitted to the terminal through a DCI signaling when performing a PUCCH resource scheduling for the terminal. Correspondingly, the terminal receives the PUCCH resource configuration information transmitted by the base station through the DCI.

Alternatively, the configuration sub-information of the primary transmitting point among the N transmitting points includes a first time-frequency resource configured by the primary transmitting point for the terminal for performing an HARQ feedback.

The configuration sub-information of another transmitting point includes a resource offset of a second time-frequency resource relative to the first time-frequency resource, the second time-frequency resource is a time-frequency resource configured by the another transmitting point for the terminal for performing an HARQ feedback, and the another transmitting point is any transmitting point among the N transmitting points except the primary transmitting point.

In the embodiment of the present disclosure, when the PUCCH resource configuration information negotiated by the N transmitting points is aperiodic PUCCH resource configuration information, the PUCCH resource configuration information may consist of complete configuration sub-information of a transmitting point (i.e., configuration sub-information of the primary transmitting point) and an offset of configuration sub-information of each of other transmitting points relative to the complete configuration sub-information, so as to reduce the amount of data occupied by signaling interactions between the base station and the terminal, and improve the efficiency of the resource scheduling.

Alternatively, the offset of the second time-frequency resource relative to the first time-frequency resource includes a time domain offset of the second time-frequency resource relative to the first time-frequency resource. A frequency domain resource corresponding to the second time-frequency resource is the same as a frequency domain corresponding to the first time-frequency resource and the number of orthogonal frequency division multiplexing (OFDM) symbols occupied by the second time-frequency resource is the same as the number of OFDM symbols occupied by the first time-frequency resource.

When the PUCCH resource configuration information consists of complete configuration sub-information of a transmitting point and an offset of configuration sub-information of each of other transmitting points relative to the complete configuration sub-information, the offset may be a time domain offset between the complete configuration sub-information and the configuration sub-information of each of the other transmitting points. Correspondingly, in this case, the frequency domain resource in the PUCCH resource corresponding to a piece of configuration sub-information among multiple pieces of configuration sub-information may be the same as the frequency domain resource in the PUCCH resource corresponding to another piece of configuration sub-information among the multiple pieces of configuration sub-information, and the number of OFDM symbols in the PUCCH resource corresponding to the piece of configuration sub-information among the multiple pieces of configuration sub-information may be the same as the number of OFDM symbols in the PUCCH resource corresponding to the another piece of configuration sub-information among the multiple pieces of configuration sub-information.

For example, the base station may transmit the DCI signaling through the primary TRP to indicate the PUCCH resource corresponding to the primary TRP to the terminal, and the PUCCH resource corresponding to the primary TRP may include the time-frequency resource and the uplink transmitting beam information. For the time-frequency resources of the PUCCHs corresponding to other TRPs in the base station, an offset will be provided. For example, a time offset is M symbols (the value of M needs to be given according to the panel capability and the current panel status of the terminal, that is, the time length of the M symbols needs to be greater than or equal to the time required by the terminal to perform at least one of the transmitting beam switching or the panel switching). In this case, it is preferable that the PUCCHs corresponding to the multiple TRPs have the same frequency domain resources and occupy the same number of time symbols. The uplink transmitting beam information in the PUCCH resource corresponding to another TRP (i.e., each of the other TRPs) may be obtained by the terminal according to a PDCCH transmitted by the another TRP to the terminal. For example, a DCI signaling in the PDCCH transmitted by the another TRP to the terminal may explicitly give the uplink transmitting beam information for the PUCCH corresponding to the another TRP, or the uplink transmitting beam in the PUCCH resource corresponding to the another TRP may be the uplink transmitting beam corresponding to the downlink beam for the latest PDCCH received by the terminal from the another TRP. With this method, PUCCH resources can be dynamically allocated without overlapping, and only the primary TRP is required to inform the another TRP of the time-frequency resource position of the PUCCH corresponding to the primary TRP and a relative offset of the another TRP. After receiving the information, the another TRP can determine its own time-frequency resources of the PUCCH used by the terminal to transmit the HARQ. Then, if the another TRP need to allocate PUCCH resources for transmitting other information such as channel state information (CSI) feedback and uplink scheduling request (SR), the PUCCH resources for transmitting the HARQ can be excluded from the allocation. If the PUCCH resources for transmitting the HARQ overlap with the allocated PUCCH resources for transmitting other information, the another TRP may re-allocate PUCCH resources for transmitting other information to avoid overlapping of the resources.

In operation 405, the terminal transmits the PUCCH information to the base station according to the PUCCH resource configuration information, and correspondingly, the base station receives the PUCCH information.

Alternatively, in response to PUCCH resources corresponding to at least two pieces of PUCCH information overlapping, the terminal may determine respective information types of the at least two pieces of PUCCH information and transmitting points respectively corresponding to the at least two pieces of PUCCH information among the N transmitting points. Then, according to the respective information types of the at least two pieces of PUCCH information and the transmitting points respectively corresponding to the at least two pieces of PUCCH information among the N transmitting points, the terminal may transmit all or part of the at least two pieces of PUCCH information on the PUCCH resources corresponding to the at least two pieces of PUCCH information. The information types include HARQ feedback information and non-HARQ feedback information. The N transmitting points include a primary transmitting point and another transmitting point expect the primary transmitting point.

In the embodiment of the present disclosure, in a case that when generating the PUCCH resource configuration information, the base station does not generate the PUCCH resource configuration information through negotiation between the N transmitting points as recited in operation 403, PUCCH resources indicated by the all configuration sub-information in the PUCCH resource configuration information may overlap, and correspondingly, PUCCH resources scheduled by the respective transmitting points for the terminal may also overlap, thereby causing PUCCH resources overlap and collide when the terminal side transmits the PUCCH information.

In the embodiment of the present disclosure, in a case that PUCCH resources overlap and collide when the terminal transmits the PUCCH information to the base station, the terminal may also transmit the PUCCH information by adopting a certain strategy. For example, the PUCCH information is transmitted according to the transmitting point of the base station corresponding to the PUCCH information and the information type of the PUCCH information.

For example, when the PUCCH resource, for transmitting HARQ, corresponding to a certain TRP in the base station overlaps with the PUCCH resource, for transmitting other uplink information, corresponding to the certain TRP in the base station, that is, the information such as CSI/SR and the HARQ feedback information that the terminal needs to transmit to the same TRP overlap and collide, the terminal may solve this problem by adopting the diversity-multiplexing method or the discarded priority definition method.

Alternatively, when all or part of the at least two pieces of PUCCH information are transmitted on the PUCCH resources corresponding to the at least two pieces of PUCCH information according to the respective information types of the at least two pieces of PUCCH information and the transmitting points respectively corresponding to the at least two pieces of PUCCH information among the N transmitting points, in response to the at least two pieces of PUCCH information including HARQ feedback information corresponding to the primary transmitting point and HARQ feedback information corresponding to the another transmitting point, the terminal may transmit the at least two pieces of PUCCH information in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

For example, if each TRP transmits a DCI signaling to the terminal, that is, each TRP allocates a dynamic PUCCH resource for transmitting the HARQ, then the PUCCH resource, for transmitting the HARQ, corresponding to TRP #0 (i.e., the primary TRP) may overlap with the PUCCH resource, for transmitting the HARQ, corresponding to another TRP (such as TRP #1). The solutions may be as follows.

1) Only the HARQ feedback corresponding to the primary TRP is transmitted, and the HARQ feedback corresponding to the another TRP is not transmitted.

2) The HARQ feedbacks corresponding to the multiple TRPs are transmitted. For example, a bit sequence cascading the HARQ states corresponding to the multiple TRPs is transmitted. For example, each HARQ feedback has 1 bit, "0" identifies NACK, "1" identifies ACK (or vice versa, "0" identifies ACK, "1" identifies NACK). In the solution shown in the present disclosure, the HARQ feedback resources corresponding to the multiple TRPs (for example, two TRPs) collide with each other, a PUCCH resource needs to transmit 2 bit, and each bit corresponds to a HARQ feedback corresponding to a TRP.

Alternatively, when all or part of the at least two pieces of PUCCH information are transmitted on the PUCCH resources corresponding to the at least two pieces of PUCCH information according to the respective information types of the at least two pieces of PUCCH information and the transmitting points respectively corresponding to the at least two pieces of PUCCH information among the N transmitting points, in response to the at least two pieces of PUCCH information including HARQ feedback information corresponding to the primary transmitting point and non-HARQ feedback information corresponding to the another transmitting point, the terminal may transmit the at least two pieces of PUCCH information in one of the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

For example, if each TRP transmits a DCI signaling to the terminal, that is, each TRP allocates a dynamic PUCCH resource for transmitting the HARQ, then the PUCCH resource, for transmitting the HARQ, corresponding to the primary TRP may overlap with the PUCCH resource, for transmitting the other information (such as CSI feedback or SR), corresponding to the another TRP, and the solutions may be as follows.

1) Only the HARQ feedback corresponding to the primary TRP is transmitted.

2) According to the priority order of the HARQ feedback, CSI and SR, the information with the lower priority is discarded, and the information with the higher priority is transmitted. For example, if the HARQ feedback has the highest priority, the HARQ feedback is transmitted, and the other information is discarded.

3) Multiple pieces of uplink information are multiplexed and then transmitted together.

Alternatively, when all or part of the at least two pieces of PUCCH information are transmitted on the PUCCH resources corresponding to the at least two pieces of PUCCH information according to the respective information types of the at least two pieces of PUCCH information and the transmitting points respectively corresponding to the at least two pieces of PUCCH information among the N transmitting points, in response to the at least two pieces of PUCCH information including non-HARQ feedback information corresponding to the primary transmitting point and HARQ feedback information corresponding to the another transmitting point, the terminal may transmit the at least two pieces of PUCCH information in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

For example, if each TRP transmits a DCI signaling to the terminal, that is, each TRP allocates a dynamic PUCCH resource for transmitting HARQ, then the PUCCH resource, for transmitting other information (such as CSI feedback or SR), corresponding to the primary TRP may overlap with the PUCCH resource, for transmitting HARQ, corresponding to the another TRP. The solutions may be as follows.

1) Only other information corresponding to the primary TRP, such as CSI feedback or SR, is transmitted.

2) According to the priority order of the HARQ feedback, CSI and SR, the information with the lower priority is discarded, and the information with the higher priority is transmitted. For example, if the HARQ feedback has the highest priority, the HARQ feedback is transmitted, and the other information is discarded.

3) Multiple pieces of uplink information are multiplexed and then transmitted together.

In conclusion, according to the solution shown in the embodiment of the present disclosure, the base station determines, through negotiation between two or more transmitting points in the base station, PUCCH resources allocated by respective transmitting points to the terminal, and indicates the PUCCH resources allocated through negotiation to the terminal, and the terminal performs uplink transmission according to the PUCCH resources allocated through negotiation, so as to avoid resource collision to the utmost extent when the terminal transmits the PUCCH information to the base station. In this way, when the terminal and the multiple transmitting points of the base station perform data transmission, more and more effective uplink signaling can be transmitted to the multiple transmitting points of the base station on as few PUCCH resources as possible, thereby improving the spatial diversity efficiency.

In addition, in the solution shown in the embodiment of the present disclosure, when resources corresponding to two pieces of PUCCH information overlap and collide at the terminal side, it is determined, according to transmitting points of the base station corresponding to the two pieces of PUCCH information and information types of the two pieces of PUCCH information, which piece(s) of PUCCH information is/are transmitted, thereby providing a solution for avoiding collision of PUCCH information resources.

The present disclosure also provides an effective solution when PUCCH resources for multiple transmitting points overlap and collide. Referring to FIG. 5, FIG. 5 is a flowchart of a method for transmission of uplink data according to an example of the present disclosure. The method may be applied to the wireless communication system illustrated in FIG. 1 and the method is performed by a terminal in the wireless communication system. As illustrated in FIG. 5, the method may include the following operations.

In operation 501, in response to PUCCH resources corresponding to at least two pieces of PUCCH information overlapping, the terminal determines respective information types of the at least two pieces of PUCCH information and transmitting points respectively corresponding to the at least two pieces of PUCCH information among N transmitting points in the base station. N is an integer greater than or equal to 2.

In operation 502, according to the respective information types of the at least two pieces of PUCCH information and the transmitting points respectively corresponding to the at least two pieces of PUCCH information among the N transmitting points, the terminal transmits all or part of the at least two pieces of PUCCH information on PUCCH resources corresponding to the at least two pieces of PUCCH information.

The information types include HARQ feedback information and non-HARQ feedback information. The N transmitting points include a primary transmitting point and another transmitting point expect the primary transmitting point.

Alternatively, when all or part information of the at least two pieces of PUCCH information are transmitted on the PUCCH resources corresponding to the at least two pieces of PUCCH information according to the respective information types of the at least two pieces of PUCCH information and the transmitting points respectively corresponding to the at least two pieces of PUCCH information among the N transmitting points, in response to the at least two pieces of PUCCH information including HARQ feedback information corresponding to the primary transmitting point and HARQ feedback information corresponding to the another transmitting point, the terminal may transmit the at least two pieces of PUCCH information in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

Alternatively, when all or part of the at least two pieces of PUCCH information are transmitted on the PUCCH resources corresponding to the at least two pieces of PUCCH information according to the respective information types of the at least two pieces of PUCCH information and the transmitting points respectively corresponding to the at least two pieces of PUCCH information among the N transmitting points, in response to the at least two pieces of PUCCH information including HARQ feedback information corresponding to the primary transmitting point and non-HARQ feedback information corresponding to the another transmitting point, the terminal may transmit the at least two pieces of PUCCH information in one of the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

Alternatively, when all or part of the at least two pieces of PUCCH information are transmitted on the PUCCH resources corresponding to the at least two pieces of PUCCH information according to the respective information types of the at least two pieces of PUCCH information and the transmitting points respectively corresponding to the at least two pieces of PUCCH information among the N transmitting points, in response to the at least two pieces of PUCCH information including non-HARQ feedback information corresponding to the primary transmitting point and HARQ feedback information corresponding to the another transmitting point, the terminal may transmit the at least two pieces of PUCCH information in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

In conclusion, according to the solution shown in the embodiment of the present disclosure, when the negotiation is not performed between the multiple transmitting points of the base station, and each of the multiple transmitting points configures a respective one of PUCCH resources for the terminal through a PDCCH so as to occur overlapping and collision of resources corresponding to two pieces of PUCCH information at the terminal side, the terminal determines, according to transmitting points of the base station corresponding to the two pieces of PUCCH information and information types corresponding to the two pieces of PUCCH information, that which piece(s) of PUCCH information is/are transmitted, thereby providing a solution for avoiding collision of PUCCH information resources.

The following is apparatus embodiments of the present disclosure, which may be used to perform the method embodiments of the present disclosure. The details not disclosed in the apparatus embodiments of the present disclosure may refer to the method embodiments of the present disclosure.

Figure 6:
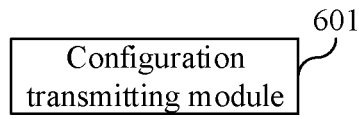
FIG. 6 is a block diagram of an apparatus for transmission of uplink data according to an example of the present disclosure.

FIG. 6 is a block diagram of an apparatus for transmission of uplink data in accordance with an example of the present disclosure. As illustrated in FIG. 6, the apparatus for transmission of uplink data may be implemented, by a manner of hardware or a combination of software and hardware, as all or part of the base station in the implementation environment illustrated in FIG. 1, and perform the operations performed by the base station in any of the embodiments illustrated in FIG. 2 or FIG. 4. The base station includes N transmitting points, N is an integer greater than or equal to 2. The apparatus for transmission of uplink data may include a configuration transmitting module 601.

The configuration transmitting module 601 is configured to transmit physical uplink control channel (PUCCH) resource configuration information to a terminal. The PUCCH resource configuration information includes respective configuration sub-information corresponding to each of the N transmitting points, and the configuration sub-information indicates a PUCCH resource configured for the terminal by the transmitting point.

Alternatively, the apparatus further includes a resource negotiation module.

The resource negotiation module is configured to: before the configuration transmitting module transmits the PUCCH resource configuration information to the terminal, generate the PUCCH resource configuration information through negotiation between the N transmitting points.

Alternatively, the configuration transmitting module includes a first configuration transmitting sub-module and an activating sub-module.

The first configuration transmitting sub-module is configured to transmit the PUCCH resource configuration information to the terminal through a radio resource control (RRC) signaling.

The activating sub-module is configured to transmit a resource activation instruction to the terminal when performing a PUCCH resource scheduling for the terminal. The resource activation instruction is configured to instruct the terminal to activate the PUCCH resource configured by the PUCCH resource configuration information.

Alternatively, the activation sub-module is configured to transmit the resource activation instruction through a media access control control element (MAC CE) when performing the PUCCH resource scheduling for the terminal.

Alternatively, the configuration sub-information includes a resource configured for the terminal by the transmitting point for transmitting a hybrid automatic repeat request (HARQ) feedback. The configuration transmitting module includes a second configuration transmitting sub-module.

The second configuration transmitting sub-module is configured to transmit the PUCCH resource configuration information to the terminal through downlink control information (DCI).

Alternatively, configuration sub-information of a primary transmitting point among the N transmitting points includes a first time-frequency resource configured for the terminal by the primary transmitting point for transmitting the HARQ feedback.

Configuration sub-information of another transmitting point includes a resource offset of a second time-frequency resource relative to the first time-frequency resource. The second time-frequency resource is a time-frequency resource configured for the terminal by the another transmitting point for transmitting the HARQ feedback, and the another transmitting point is any transmitting point, other than the primary transmitting point, among the N transmitting points.

Alternatively, the offset of the second time-frequency resource relative to the first time-frequency resource includes a time domain offset of the second time-frequency resource relative to the first time-frequency resource.

A frequency domain resource corresponding to the second time-frequency resource is the same as a frequency domain resource corresponding to the first time-frequency resource and the number of orthogonal frequency division multiplexing (OFDM) symbols occupied by the second time-frequency resource is the same as the number of OFDM symbols occupied by the first time-frequency resource.

Alternatively, the apparatus further includes an antenna capability information obtaining module.

The antenna capability information obtaining module is configured to: before the configuration transmitting module transmits the PUCCH resource configuration information to the terminal, obtain antenna capability information of at least one panel of the terminal.

The configuration transmitting module is configured to transmit the PUCCH resource configuration information to the terminal according to the antenna capability information.

Alternatively, the configuration transmitting module is configured to:

obtain panel activation information; the panel activation information is configured to indicate an activated panel in the at least one panel; and transmit the PUCCH resource configuration information to the terminal according to the panel activation information and the antenna capability information.

Alternatively, the resource negotiating module is configured to: when transmitting the PUCCH resource configuration information to the terminal according to the panel activation information and the antenna capability information, determine time resource interval threshold information according to the panel activation information and the antenna capability information, the time resource interval threshold information is configured to indicate a minimum time interval for the terminal to transmit uplink information on two PUCCH resources; and transmit the PUCCH resource configuration information to the terminal according to the time resource interval threshold information.

Alternatively, the time resource interval threshold information includes at least one of: a first time interval threshold T1, a second time interval threshold T2, a third time interval threshold T3 or a fourth time interval threshold T4.

The T1 is a minimum time interval for transmitting uplink data on different PUCCH resources successively through two panels in a case that the two panels are capable of being activated simultaneously.

The T2 is a minimum time interval for transmitting uplink data on different PUCCH resources successively through two panels in a case that the two panels are not capable of being activated simultaneously.

The T3 is a minimum time interval for transmitting uplink data on different PUCCH resources successively through two panels in a case that the two panels are capable of being activated simultaneously and the two panels are not capable of performing uplink transmission simultaneously.

The T4 is a minimum time interval for transmitting uplink data on different PUCCH resources successively through different beams in the same panel.

Figure 7:
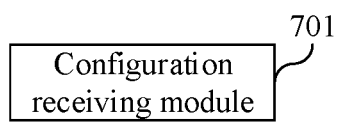
FIG. 7 is a block diagram of an apparatus for transmission of uplink data according to an example of the present disclosure.

FIG. 7 is a block diagram of an apparatus for transmission of uplink data in accordance with an example of the present disclosure. As illustrated in FIG. 7, the apparatus for transmission of uplink data may be implemented, by a manner of hardware or a combination of software and hardware, as all or part of the terminal in the implementation environment illustrated in FIG. 1, and perform the operations performed by the terminal in any of the embodiments illustrated in FIG. 3 or FIG. 4. The base station includes N transmitting points, N is an integer greater than or equal to 2. The apparatus for transmission of uplink data may include a configuration receiving module 701.

A configuration receiving module 701 is configured to receive physical uplink control channel (PUCCH) resource configuration information. The PUCCH resource configuration information includes respective configuration sub-information corresponding to each of N transmitting points in a base station, the configuration sub-information is configured to indicate a PUCCH resource configured for the terminal by the transmitting point, and N is an integer greater than or equal to 2.

Alternatively, the configuration receiving module includes a first configuration receiving sub-module, an activation indication receiving sub-module and an activating sub-module.

The first configuration receiving sub-module is configured to receive the PUCCH resource configuration information transmitted through a radio resource control (RRC) signaling.

The activation indication receiving sub-module is configured to receive a resource activation instruction. The resource activation instruction is configured to schedule the PUCCH resource.

The activating sub-module is configured to activate the PUCCH resource configured by the PUCCH resource configuration information according to the resource activation instruction.

Alternatively, the activation indication receiving sub-module is configured to: receive the resource activation instruction transmitted through a media access control control element (MAC CE) when the base station performs a PUCCH resource scheduling for the terminal.

Alternatively, the configuration sub-information includes a resource configured for the terminal by the transmitting point for transmitting a hybrid automatic repeat request (HARM) feedback.

The configuration receiving module includes a second configuration receiving sub-module.

The second configuration receiving sub-module is configured to receive the PUCCH resource configuration information transmitted through downlink control information (DCI).

Alternatively, configuration sub-information of a primary transmitting point among the N transmitting points includes a first time-frequency resource configured for the terminal by the primary transmitting point for transmitting the HARQ feedback.

Configuration sub-information of another transmitting point includes a resource offset of a second time-frequency resource relative to the first time-frequency resource. The second time-frequency resource is a time-frequency resource configured for the terminal by the another transmitting point for transmitting the HARQ feedback, and the another transmitting point is any transmitting point, other than the primary transmitting point, among the N transmitting points.

Alternatively, the offset of the second time-frequency resource relative to the first time-frequency resource includes a time domain offset of the second time-frequency resource relative to the first time-frequency resource.

A frequency domain resource corresponding to the second time-frequency resource is the same as a frequency domain resource corresponding to the first time-frequency resource and the number of orthogonal frequency division multiplexing (OFDM) symbols occupied by the second time-frequency resource is the same as the number of OFDM symbols occupied by the first time-frequency resource.

Alternatively, the apparatus further includes a determining module and an information transmitting module.

The determining module is configured to: in response to PUCCH resources corresponding to at least two pieces of PUCCH information overlapping, determine respective information types of the at least two pieces of PUCCH information and transmitting points respectively corresponding to the at least two pieces of PUCCH information among the N transmitting points.

The information transmitting module is configured to: according to the respective information types of the at least two pieces of PUCCH information and the transmitting points respectively corresponding to the at least two pieces of PUCCH information among the N transmitting points, transmit all or part of the at least two pieces of PUCCH information on the PUCCH resources corresponding to the at least two pieces of PUCCH information.

The information types include HARQ feedback information and non-HARQ feedback information, and the N transmitting points include a primary transmitting point and another transmitting point other than the primary transmitting point.

Alternatively, the transmitting module is configured to: in response to the at least two pieces of PUCCH information including HARQ feedback information corresponding to the primary transmitting point and HARQ feedback information corresponding to the another transmitting point, transmit the at least two pieces of PUCCH information in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

Alternatively, the transmitting module is configured to: in response to the at least two pieces of PUCCH information including HARQ feedback information corresponding to the primary transmitting point and non-HARQ feedback information corresponding to the another transmitting point, transmit the at least two pieces of PUCCH information in one of the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

Alternatively, the transmitting module is configured to: in response to the at least two pieces of PUCCH information including non-HARQ feedback information corresponding to the primary transmitting point and HARQ feedback information corresponding to the another transmitting point, transmit the at least two pieces of PUCCH information in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

The present disclosure further provides an apparatus for transmission of uplink data. The apparatus for transmission of uplink data may be implemented, by a manner of hardware or a combination of software and hardware, as all or part of a terminal in the implementation environment illustrated in FIG. 1, and may perform operations performed by the terminal in any of the embodiments shown in FIG. 3 or FIG. 4. The apparatus for transmission of uplink data may include a determining module and a transmitting module.

The determining module is configured to: in response to PUCCH resources corresponding to at least two pieces of PUCCH information overlapping, determine respective information types of the at least two pieces of PUCCH information and transmitting points respectively corresponding to the at least two pieces of PUCCH information among the N transmitting points in the base station, and N is an integer greater than or equal to 2.

The transmitting module is configured to: according to the respective information types of the at least two pieces of PUCCH information and the transmitting points respectively corresponding to the at least two pieces of PUCCH information among the N transmitting points, transmit all or part of the at least two pieces of PUCCH information on the PUCCH resources corresponding to the at least two pieces of PUCCH information.

The information types include HARQ feedback information and non-HARQ feedback information, and the N transmitting points include a primary transmitting point and another transmitting point other than the primary transmitting point.

Alternatively, the transmitting module is configured to: in response to the at least two pieces of PUCCH information including HARQ feedback information corresponding to the primary transmitting point and HARQ feedback information corresponding to the another transmitting point, transmit the at least two pieces of PUCCH information in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

Alternatively, the transmitting module is configured to: in response to the at least two pieces of PUCCH information including HARQ feedback information corresponding to the primary transmitting point and non-HARQ feedback information corresponding to the another transmitting point, transmit the at least two pieces of PUCCH information in one of the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

Alternatively, the transmitting module is configured to: in response to the at least two pieces of PUCCH information including non-HARQ feedback information corresponding to the primary transmitting point and HARQ feedback information corresponding to the another transmitting point, transmit the at least two pieces of PUCCH information in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

An example of the present disclosure further provides an apparatus for transmission of uplink data that can be implemented as all or part of the base station in the system illustrated in FIG. 1 to perform all or part of the operations performed by the base station in the embodiment illustrated in FIG. 2 or FIG. 4 described above of the present disclosure. The base station includes N transmitting points, N is an integer greater than or equal to 2. The apparatus for transmission of uplink data includes a processor and a memory for storing instructions executable by the processor.

The processor is configured to perform the following operations.

Physical uplink control channel (PUCCH) resource configuration information is transmitted to a terminal. The PUCCH resource configuration information includes respective configuration sub-information corresponding to each of the N transmitting points, and the configuration sub-information is configured to indicate a PUCCH resource configured for the terminal by the transmitting point.

Alternatively, before the PUCCH resource configuration information is transmitted to the terminal, the processor is configured to perform the following operation.

The PUCCH resource configuration information is generated through negotiation between the N transmitting points.

Alternatively, the operation that the PUCCH resource configuration information is transmitted to the terminal includes the following operations.

The PUCCH resource configuration information is transmitted to the terminal through a radio resource control (RRC) signaling.

A resource activation instruction is transmitted to the terminal when performing a PUCCH resource scheduling for the terminal. The resource activation instruction is configured to instruct the terminal to activate the PUCCH resource configured by the PUCCH resource configuration information.

Alternatively, the operation that the resource activation instruction is transmitted to the terminal when performing the PUCCH resource scheduling for the terminal includes the following operations.

The resource activation instruction is transmitted through a media access control control element (MAC CE) when performing the PUCCH resource scheduling for the terminal.

Alternatively, the configuration sub-information includes a resource configured for the terminal by the transmitting point for transmitting a hybrid automatic repeat request (HARQ) feedback.

The operation that the PUCCH resource configuration information is transmitted to the terminal includes the following operations.

The PUCCH resource configuration information is transmitted to the terminal through downlink control information (DCI).

Alternatively, configuration sub-information of a primary transmitting point among the N transmitting points includes a first time-frequency resource configured for the terminal by the primary transmitting point for transmitting the HARQ feedback.

Configuration sub-information of another transmitting point includes a resource offset of a second time-frequency resource relative to the first time-frequency resource. The second time-frequency resource is a time-frequency resource configured for the terminal by the another transmitting point for transmitting the HARQ feedback, and the another transmitting point is any transmitting point, other than the primary transmitting point, among the N transmitting points.

Alternatively, the offset of the second time-frequency resource relative to the first time-frequency resource includes a time domain offset of the second time-frequency resource relative to the first time-frequency resource.

A frequency domain resource corresponding to the second time-frequency resource is the same as a frequency domain resource corresponding to the first time-frequency resource and the number of orthogonal frequency division multiplexing (OFDM) symbols occupied by the second time-frequency resource is the same as the number of OFDM symbols occupied by the first time-frequency resource.

Alternatively, before the PUCCH resource configuration information is transmitted to the terminal, the processor is configured to perform the following operations.

Antenna capability information of at least one panel of the terminal is obtained.

The operation that the PUCCH resource configuration information is transmitted to the terminal includes the following operations.

The PUCCH resource configuration information is transmitted to the terminal according to the antenna capability information.

Alternatively, the operation that the PUCCH resource configuration information is transmitted to the terminal according to the antenna capability information includes the following operations.

Panel activation information is obtained. The panel activation information is configured to indicate an activated panel in the at least one panel.

The PUCCH resource configuration information is transmitted to the terminal according to the panel activation information and the antenna capability information.

Alternatively, the operation that the PUCCH resource configuration information is transmitted to the terminal according to the panel activation information and the antenna capability information includes the following operations.

Time resource interval threshold information is determined according to the panel activation information and the antenna capability information. The time resource interval threshold information is configured to indicate a minimum time interval for the terminal to transmit uplink information on two PUCCH resources.

The PUCCH resource configuration information is transmitted to the terminal according to the time resource interval threshold information.

Alternatively, the time resource interval threshold information includes at least one of: a first time interval threshold T1, a second time interval threshold T2, a third time interval threshold T3 or a fourth time interval threshold T4.

The T1 is a minimum time interval for transmitting uplink data on different PUCCH resources successively through two panels in a case that the two panels are capable of being activated simultaneously.

The T2 is a minimum time interval for transmitting uplink data on different PUCCH resources successively through two panels in a case that the two panels are not capable of being activated simultaneously.

The T3 is a minimum time interval for transmitting uplink data on different PUCCH resources successively through two panels in a case that the two panels are capable of being activated simultaneously and the two panels are not capable of performing uplink transmission simultaneously.

The T4 is a minimum time interval for transmitting uplink data on different PUCCH resources successively using different beams through the same panel.

An example of the present disclosure further provides an apparatus for transmission of uplink data that can be implemented as all or part of a terminal in the system illustrated in FIG. 1 to perform all or part of the operations performed by the terminal in the embodiment illustrated in FIG. 3 or FIG. 4 described above of the present disclosure, the apparatus for transmission of uplink data includes a processor, a memory for storing instructions executable by the processor.

The processor is configured to perform the following operations.

Physical uplink control channel (PUCCH) resource configuration information is received. The PUCCH resource configuration information includes respective configuration sub-information corresponding to each of N transmitting points in a base station, the configuration sub-information is configured to indicate a PUCCH resource configured for the terminal by the transmitting point, and N is an integer greater than or equal to 2.

Alternatively, the operation that the PUCCH resource configuration information is received includes the following operations.

The PUCCH resource configuration information transmitted through a radio resource control (RRC) signaling is received.

A resource activation instruction is received. The resource activation instruction is configured to schedule the PUCCH resource.

The PUCCH resource configured by the PUCCH resource configuration information is activated according to the resource activation instruction.

Alternatively, the operation that the resource activation instruction is received includes the following operations.

The resource activation instruction transmitted by the base station is received through a media access control control element (MAC CE) when the base station performs a PUCCH resource scheduling for the terminal.

Alternatively, the configuration sub-information includes a resource configured for the terminal by the transmitting point for transmitting a hybrid automatic repeat request (HARM) feedback.

The operation that the PUCCH resource configuration information is received includes the following operations.

The PUCCH resource configuration information transmitted through downlink control information (DCI) is received.

Alternatively, configuration sub-information of a primary transmitting point among the N transmitting points includes a first time-frequency resource configured for the terminal by the primary transmitting point for transmitting the HARQ feedback.

Configuration sub-information of another transmitting point includes a resource offset of a second time-frequency resource relative to the first time-frequency resource. The second time-frequency resource is a time-frequency resource configured for the terminal by the another transmitting point for transmitting the HARQ feedback, and the another transmitting point is any transmitting point, other than the primary transmitting point, among the N transmitting points.

Alternatively, the offset of the second time-frequency resource relative to the first time-frequency resource includes a time domain offset of the second time-frequency resource relative to the first time-frequency resource.

A frequency domain resource corresponding to the second time-frequency resource is the same as a frequency domain resource corresponding to the first time-frequency resource and the number of orthogonal frequency division multiplexing (OFDM) symbols occupied by the second time-frequency resource is the same as the number of OFDM symbols occupied by the first time-frequency resource.

Alternatively, the processor is further configured to perform the following operations.

In response to PUCCH resources corresponding to at least two pieces of PUCCH information overlapping, respective information types of the at least two pieces of PUCCH information and transmitting points respectively corresponding to the at least two pieces of PUCCH information among the N transmitting points are determined.

According to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information.

The information types include HARQ feedback information and non-HARQ feedback information, and the N transmitting points include a primary transmitting point and another transmitting point other than the primary transmitting point.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information includes the following operations.

In response to the at least two pieces of PUCCH information including HARQ feedback information corresponding to the primary transmitting point and HARQ feedback information corresponding to the another transmitting point, the at least two pieces of PUCCH information are transmitted in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information includes the following operations.

In response to the at least two pieces of PUCCH information including HARQ feedback information corresponding to the primary transmitting point and non-HARQ feedback information corresponding to the another transmitting point, the at least two pieces of PUCCH information are transmitted in one of the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information includes the following operations.

In response to the at least two pieces of PUCCH information including non-HARQ feedback information corresponding to the primary transmitting point and HARQ feedback information corresponding to the another transmitting point, the at least two pieces of PUCCH information are transmitted in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

An example of the present disclosure further provides an apparatus transmission of uplink data that can be implemented as all or part of a terminal in the system illustrated in FIG. 1 to perform all or part of the operations performed by the terminal in the embodiment illustrated in FIG. 3 or FIG. 4 described above of the present disclosure. The apparatus for transmission of uplink data includes a processor, and a memory for storing instructions executable by the processor.

The processor is configured to perform the following operations.

In response to PUCCH resources corresponding to at least two pieces of PUCCH information overlapping, respective information types of the at least two pieces of PUCCH information and transmitting points respectively corresponding to the at least two pieces of PUCCH information among the N transmitting points in the base station are determined, and N is an integer greater than or equal to 2.

According to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information.

The information types include HARQ feedback information and non-HARQ feedback information, and the N transmitting points include a primary transmitting point and another transmitting point other than the primary transmitting point.

Alternatively, according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information.

In response to the at least two pieces of PUCCH information including HARQ feedback information corresponding to the primary transmitting point and HARQ feedback information corresponding to the another transmitting point, the at least two pieces of PUCCH information are transmitted in one of the following manners.

The HARQ feedback information corresponding to the primary transmitting point is transmitted on the PUCCH resources corresponding to the at least two pieces of PUCCH information.

A bit sequence cascading the at least two pieces of PUCCH information is transmitted on the PUCCH resources corresponding to the at least two pieces of PUCCH information. Each of bits in the bit sequence indicates HARQ feedback information corresponding to a transmitting point.

The operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information includes the following operations.

In response to the at least two pieces of PUCCH information including HARQ feedback information corresponding to the primary transmitting point and non-HARQ feedback information corresponding to the another transmitting point, the at least two pieces of PUCCH information are transmitted in one of the following manners.

The HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

Alternatively, the operation that according to the respective information types of the at least two pieces of PUCCH information and the transmitting points respectively corresponding to the at least two pieces of PUCCH information among the N transmitting points, all or part of the at least two pieces of PUCCH information are transmitted on the PUCCH resources corresponding to the at least two pieces of PUCCH information includes the following operations.

In response to the at least two pieces of PUCCH information including non-HARQ feedback information corresponding to the primary transmitting point and HARQ feedback information corresponding to the another transmitting point, the at least two pieces of PUCCH information are transmitted in one of the following manners.

The non-HARQ feedback information corresponding to the primary transmitting point is transmitted on the PUCCH resources corresponding to the at least two pieces of PUCCH information.

PUCCH information having a highest priority among the at least two pieces of PUCCH information is transmitted on the PUCCH resources corresponding to the at least two pieces of PUCCH information.

The at least two pieces of PUCCH information are multiplexed and transmitted on the PUCCH resources corresponding to the at least two pieces of PUCCH information.

It should be noted that when the apparatus provided by the above embodiments realizes its functions, the division of the above functional modules is only used as an example. In actual applications, the above functions can be allocated by different functional modules according to actual needs. That is, the content structure of the device is divided into different functional modules to complete all or part of the functions described above.

Regarding the apparatus in the above-mentioned embodiments, the specific manner in which each module performs operations has been described in detail in the method embodiments, and detailed description will not be given here.

The above contents mainly introduce the solutions provided by the embodiments of the present disclosure from the perspective of the interaction between the base station and the terminal. It can be understood that in order to realize the above-mentioned functions, the base station and the terminal include hardware structures and/or software modules corresponding to each function. In combination with the units and algorithm operations of the examples described in the embodiments disclosed in the present disclosure, the embodiments of the present disclosure can be implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solutions of the embodiments of the present disclosure.

Figure 8:
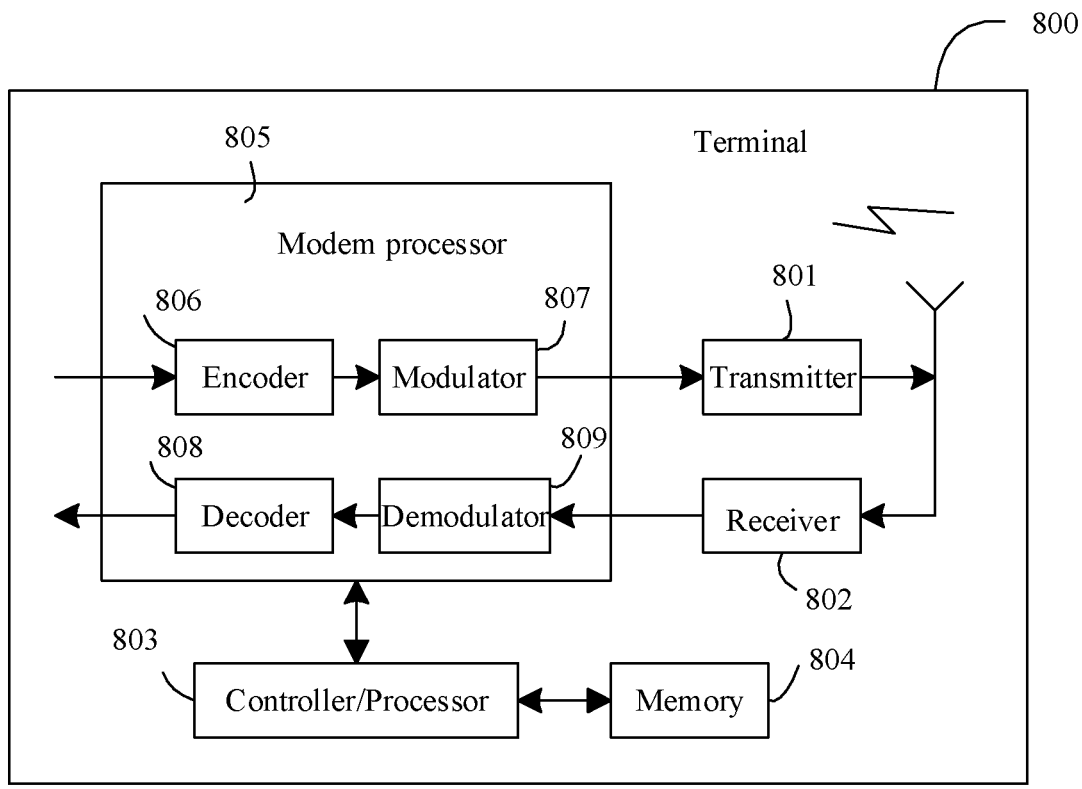
FIG. 8 is a structural diagram of a terminal according to an example of the present disclosure.

FIG. 8 is a schematic structural diagram of a terminal according to an example.

The terminal 800 includes a transmitter 801, a receiver 802, and a processor 803. The processor 803 may also be a controller, which is represented as "controller/processor 803" in FIG. 8. Alternatively, the terminal 800 may further include a modem processor 805, where the modem processor 805 may include an encoder 806, a modulator 807, a decoder 808, and a demodulator 809.

In one example, the transmitter 801 adjusts (for example, through analog conversion, filtering, amplification, or up-conversion, etc.) the output samples and generates an uplink signal, which is transmitted to the base station described in the above embodiment via an antenna. On the downlink, the antenna receives the downlink signal transmitted by the base station in the above embodiment. The receiver 802 adjusts (e.g., through filtering, amplification, down-conversion, and digitizations, etc.) the signal received from the antenna and provides input samples. In the modem processor 805, the encoder 806 receives service data and signaling messages to be transmitted on the uplink, and processes the service data and signaling messages (for example, through formatting, encoding, and interleaving). The modulator 807 further processes (for example, through symbol mapping and modulation) the encoded service data and signaling messages and provides output samples. The demodulator 809 processes (e.g., through demodulation) the input samples and provides symbol estimations. The decoder 808 processes (e.g., through de-interleaving and decoding) the symbol estimations and provides decoded data and signaling messages sent to the terminal 800. The encoder 806, the modulator 807, the demodulator 809, and the decoder 808 can be implemented by a synthesized modem processor 805. These units are processed according to the wireless access technology adopted by the wireless access network (for example, the access technology of LTE and other evolved systems). It should be noted that when the terminal 800 does not include the modem processor 805, the above-mentioned functions of the modem processor 805 may also be performed by the processor 803.

The processor 803 controls and manages the actions of the terminal 800, and is configured to execute the processing procedure performed by the terminal 800 in the above-mentioned embodiment of the present disclosure. For example, the processor 803 is further configured to execute each operation on the terminal side in the above-mentioned method embodiments, and/or other operations of the technical solution described in the embodiments of the present disclosure.

Further, the terminal 800 may further include a memory 804, and the memory 804 is configured to store program codes and data for the terminal 800.

It can be understood that FIG. 8 only shows a simplified design of the terminal 800. In practical applications, the terminal 800 may include any number of transmitters, receivers, processors, modem processors, memories, etc., and all terminals that can implement the embodiments of the present disclosure are within the protection scope of the embodiments of the present disclosure.

Figure 9:
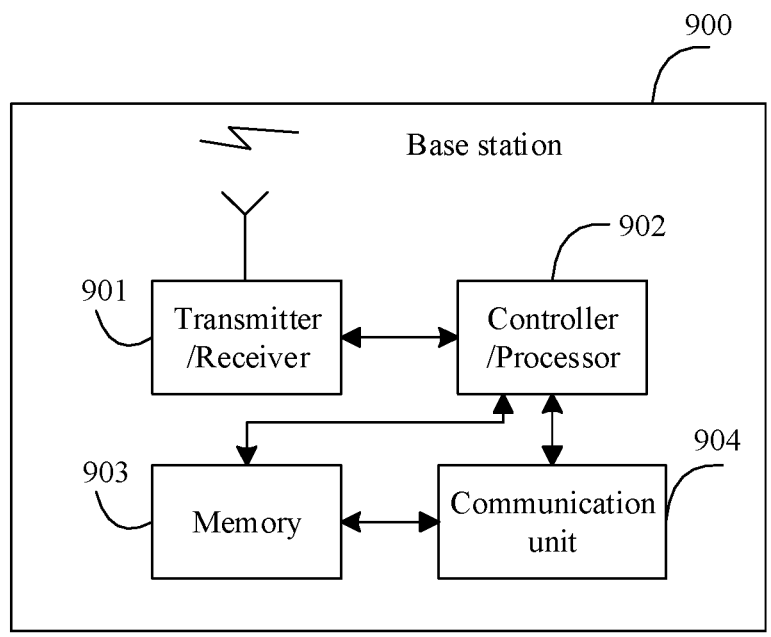
FIG. 9 is a structural diagram of a base station according to an example of the present disclosure.

FIG. 9 is a schematic structural diagram of a base station according to an example of the present disclosure.

The base station 900 includes a transmitter/receiver 901 and a processor 902.

The processor 902 may also be a controller, which is represented as "controller/processor 902" in FIG. 9. The transmitter/receiver 901 is used to support the sending and receiving of information between the base station and the terminal in the above-mentioned embodiments, and to support communication between the base station and other network entities. The processor 902 performs various functions for communicating with the terminal. On the uplink, the uplink signal from the terminal is received via an antenna, demodulated by the receiver 901 (for example, a high-frequency signal is demodulated into a baseband signal), and further processed by the processor 902 to restore service data and signaling messages sent by the terminal. On the downlink, service data and signaling messages are processed by the processor 902, and modulated by the transmitter 901 (for example, the baseband signal is modulated into a high-frequency signal) to generate a downlink signal, which is transmitted to the terminal via an antenna. It should be noted that the above-mentioned demodulation or modulation function may also be completed by the processor 902. For example, the processor 902 is further configured to execute various operations on the base station side in the above-mentioned method embodiments, and/or other operations of the technical solutions described in the embodiments of the present disclosure.

Further, the base station 900 may further include a memory 903, and the memory 903 is used to store program codes and data of the base station 900. In addition, the base station 900 may further include a communication unit 904. The communication unit 904 is configured to support the base station 900 to communicate with other network entities (for example, network devices in the core network, etc.). For example, in a 5G NR system, the communication unit 904 may be an NG-U interface for supporting the base station 900 to communicate with a User Plane Function (UPF) entity. Or, the communication unit 904 may also be an NG-C interface for supporting the base station 900 to communicate with an Access and Mobility Management Function (AMF) entity.

It can be understood that FIG. 9 only shows a simplified design of the base station 900. In practical applications, the base station 900 may include any number of transmitters, receivers, processors, controllers, memories, communication units, etc., and all base stations that can implement the embodiments of the present disclosure are within the protection scope of the embodiments of the present disclosure.

The technical solutions provided by embodiments of the present disclosure include at least the following advantageous effects.

The base station having at least two transmitting points transmits to the terminal PUCCH resource configuration information including respective configuration sub-information corresponding to each of the at least two transmitting points, and each configuration sub-information indicates a PUCCH resource configured for the terminal by a respective one of the transmitting points, thereby providing a solution in which multiple transmitting points in the base station respectively configure PUCCH resources for the terminal, which extends a scheduling scenario of the PUCCH resources.

It should be appreciated by those skilled in the art that, in the one or more examples described above, the functions described in embodiments of the present disclosure may be implemented in hardware, software, firmware, or any combination thereof. When implemented using software, these functions may be stored in a computer-readable medium or transmitted as one or more instructions or code on a computer-readable medium. The computer-readable medium includes a computer storage medium and a communication medium, and the communication medium includes any medium that facilitates the transfer of a computer program from one place to another. The storage medium may be any available medium that can be accessed by a general purpose or special purpose computer.

Embodiments of the present disclosure further provide a computer storage medium for storing computer software instructions to be used by the terminal or base station, including a program designed to perform the method for transmission of uplink data.

It should be understood that the "multiple" mentioned herein refers to two or more. The term "and/or" herein describes an association relationship of associated objects, which means that there may be three relationships. For example "A and/or B" may have three meanings: A exists alone, A and B exist at the same time and B exists alone. In addition, the character "I" herein generally indicates that the associated objects before and after the character "I" are in an "or" relationship.

After considering the specification and practicing the disclosure disclosed herein, those skilled in the art will easily think of other embodiments of the present disclosure. The present disclosure is intended to cover any variations, uses, or adaptive changes of the present disclosure. These variations, uses, or adaptive changes follow the general principles of the present disclosure and include common knowledge or conventional technical means in the technical field not disclosed in the present disclosure. The specification and the embodiments are only to be regarded as exemplary, and the true scope and spirit of the present disclosure are indicated by the following claims.

It should be understood that the present disclosure is not limited to the precise structure described above and illustrated in the drawings, and various modifications and changes can be made without departing from the scope of the present disclosure. The scope of the present disclosure is limited only by the appended claims.

The invention claimed is:

1. A method for transmission of uplink data, comprising:
transmitting, by a base station, physical uplink control channel (PUCCH) resource configuration information to a terminal, wherein the base station comprises at least two transmitting points, the PUCCH resource configuration information comprises respective configuration sub-information corresponding to each of the at least two transmitting points, and the configuration sub-information indicates a PUCCH resource configured for the terminal by the transmitting point,
wherein the configuration sub-information comprises a resource, configured for the terminal by the transmitting point, for transmitting a hybrid automatic repeat request (HARQ) feedback; and
transmitting, by the base station, the PUCCH resource configuration information to the terminal comprises:
transmitting, by the base station, the PUCCH resource configuration information to the terminal through downlink control information (DCI); and
wherein configuration sub-information of a primary transmitting point among the at least two transmitting points comprises a first time-frequency resource configured for the terminal by the primary transmitting point for transmitting the HARQ feedback; and
configuration sub-information of another transmitting point comprises a resource offset of a second time-frequency resource relative to the first time-frequency resource, wherein the second time-frequency resource is a time-frequency resource configured for the terminal by the another transmitting point for transmitting the HARQ feedback, and the another transmitting point is any transmitting point, other than the primary transmitting point, among the at least two transmitting points.

2. The method of claim 1, further comprising:
generating, by the base station, the PUCCH resource configuration information through negotiation between the at least two transmitting points.

3. The method of claim 1, wherein
the offset of the second time-frequency resource relative to the first time-frequency resource comprises a time domain offset of the second time-frequency resource relative to the first time-frequency resource; and
a frequency domain resource corresponding to the second time-frequency resource is the same as a frequency domain resource corresponding to the first time-frequency resource, and a number of orthogonal frequency division multiplexing (OFDM) symbols occupied by the second time-frequency resource is the same as a number of OFDM symbols occupied by the first time-frequency resource.

4. The method of claim 1, further comprising:
obtaining, by the base station, antenna capability information of at least one panel of the terminal; and
wherein transmitting, by the base station, the PUCCH resource configuration information to the terminal comprises:
transmitting, by the base station, the PUCCH resource configuration information to the terminal according to the antenna capability information.

5. The method of claim 4, wherein transmitting, by the base station, the PUCCH resource configuration information to the terminal according to the antenna capability information comprises:
obtaining, by the base station, panel activation information, wherein the panel activation information indicates an activated panel in the at least one panel; and
transmitting, by the base station, the PUCCH resource configuration information to the terminal according to the panel activation information and the antenna capability information.

6. A method for transmission of uplink data transmission, comprising:
receiving, by a terminal, physical uplink control channel (PUCCH) resource configuration information, wherein the PUCCH resource configuration information comprises respective configuration sub-information corresponding to each of at least two transmitting points in a base station, and the configuration sub-information indicates a PUCCH resource configured for the terminal by the transmitting point,
wherein the configuration sub-information comprises a resource, configured for the terminal by the transmitting point, for transmitting a hybrid automatic repeat request (HARQ) feedback; and receiving, by the terminal, the PUCCH resource configuration information comprises:
receiving, by the terminal, the PUCCH resource configuration information transmitted through downlink control information (DCI); and
wherein configuration sub-information of a primary transmitting point among the at least two transmitting points comprises a first time-frequency resource configured for the terminal by the primary transmitting point for transmitting the HARQ feedback; and
configuration sub-information of another transmitting point comprises a resource offset of a second time-frequency resource relative to the first time-frequency resource, wherein the second time-frequency resource is a time-frequency resource configured for the terminal by the another transmitting point for transmitting the HARQ feedback, and the another transmitting point is any transmitting point, other than the primary transmitting point, among the at least two transmitting points.

7. The method of claim 6, wherein
the offset of the second time-frequency resource relative to the first time-frequency resource comprises a time domain offset of the second time-frequency resource relative to the first time-frequency resource; and
a frequency domain resource corresponding to the second time-frequency resource is the same as a frequency domain resource corresponding to the first time-frequency resource, and a number of orthogonal frequency division multiplexing (OFDM) symbols occupied by the second time-frequency resource is the same as a number of OFDM symbols occupied by the first time-frequency resource.

8. The method of claim 6, further comprising:
in response to determining that PUCCH resources corresponding to at least two pieces of PUCCH information overlap, determining, by the terminal, respective information types of the at least two pieces of PUCCH information and transmitting points respectively corresponding to the at least two pieces of PUCCH information among the at least two transmitting points; and
transmitting, by the terminal, all or part of the at least two pieces of PUCCH information on the PUCCH resources corresponding to the at least two pieces of PUCCH information, according to the respective information types of the at least two pieces of PUCCH information and the transmitting points respectively corresponding to the at least two pieces of PUCCH information among the at least two transmitting points,
wherein the information types comprise HARQ feedback information and non-HARQ feedback information, and the at least two transmitting points comprise a primary transmitting point and another transmitting point other than the primary transmitting point.

9. The method of claim 8, wherein transmitting, by the terminal, all or part of the at least two pieces of PUCCH information on the PUCCH resources corresponding to the at least two pieces of PUCCH information according to the respective information types of the at least two pieces of PUCCH information and the transmitting points respectively corresponding to the at least two pieces of PUCCH information among the at least two transmitting points comprises:
in response to determining that the at least two pieces of PUCCH information comprise HARQ feedback information corresponding to the primary transmitting point and HARQ feedback information corresponding to the another transmitting point, transmitting, by the terminal, the at least two pieces of PUCCH information in one of following manners:
transmitting, by the terminal, the HARQ feedback information corresponding to the primary transmitting point on the PUCCH resources corresponding to the at least two pieces of PUCCH information; or
transmitting, by the terminal, a bit sequence cascading the at least two pieces of PUCCH information on the PUCCH resources corresponding to the at least two pieces of PUCCH information, wherein each of bits in the bit sequence indicates HARQ feedback information corresponding to a transmitting point.

10. The method of claim 8, wherein transmitting, by the terminal, all or part of the at least two pieces of PUCCH information on the PUCCH resources corresponding to the at least two pieces of PUCCH information according to the respective information types of the at least two pieces of PUCCH information and the transmitting points respectively corresponding to the at least two pieces of PUCCH information among the at least two transmitting points comprises:
in response to determining that the at least two pieces of PUCCH information comprise HARQ feedback information corresponding to the primary transmitting point and non-HARQ feedback information corresponding to the another transmitting point, transmitting, by the terminal, the at least two pieces of PUCCH information in one of following manners:
transmitting, by the terminal, the HARQ feedback information corresponding to the primary transmitting point on the PUCCH resources corresponding to the at least two pieces of PUCCH information;
transmitting, by the terminal, PUCCH information having a highest priority among the at least two pieces of PUCCH information on the PUCCH resources corresponding to the at least two pieces of PUCCH information; or
multiplexing and transmitting, by the terminal, the at least two pieces of PUCCH information on the PUCCH resources corresponding to the at least two pieces of PUCCH information.

11. The method of claim 8, wherein transmitting, by the terminal, all or part of the at least two pieces of PUCCH information on the PUCCH resources corresponding to the at least two pieces of PUCCH information according to the respective information types of the at least two pieces of PUCCH information and the transmitting points respectively corresponding to the at least two pieces of PUCCH information among the at least two transmitting points comprises:
in response to determining that the at least two pieces of PUCCH information comprise non-HARQ feedback information corresponding to the primary transmitting point and HARQ feedback information corresponding to the another transmitting point, transmitting, by the terminal, the at least two pieces of PUCCH information in one of following manners:
transmitting, by the terminal, the non-HARQ feedback information corresponding to the primary transmitting point on the PUCCH resources corresponding to the at least two pieces of PUCCH information;
transmitting, by the terminal, PUCCH information having a highest priority among the at least two pieces of PUCCH information on the PUCCH resources corresponding to the at least two pieces of PUCCH information; or multiplexing and transmitting, by the terminal, the at least two pieces of PUCCH information on the PUCCH resources corresponding to the at least two pieces of PUCCH information.

12. An apparatus for transmission of uplink data, for applying to a terminal, the apparatus comprising:
a receiver;
a processor;
a memory, configured to store instructions executable by the processor;
wherein the processor is configured to:
receive physical uplink control channel (PUCCH) resource configuration information through the receiver, wherein the PUCCH resource configuration information comprises respective configuration sub-information corresponding to each of at least two transmitting points in a base station, and the configuration sub-information indicates a PUCCH resource configured for the terminal by the transmitting point,
wherein the configuration sub-information comprises a resource, configured for the terminal by the transmitting point, for transmitting a hybrid automatic repeat request (HARQ) feedback; and
the processor is configured to receive, through the receiver, the PUCCH resource configuration information transmitted through downlink control information (DCI); and
wherein configuration sub-information of a primary transmitting point among the at least two transmitting points comprises a first time-frequency resource configured for the terminal by the primary transmitting point for transmitting the HARQ feedback; and
configuration sub-information of another transmitting point comprises a resource offset of a second time-frequency resource relative to the first time-frequency resource, wherein the second time-frequency resource is a time-frequency resource configured for the terminal by the another transmitting point for transmitting the HARQ feedback, and the another transmitting point is any transmitting point, other than the primary transmitting point, among the at least two transmitting points.

* * * * *